(12) United States Patent
Matsushima

(10) Patent No.: US 7,871,005 B2
(45) Date of Patent: Jan. 18, 2011

(54) INFORMATION READER FOR OPTICALLY READING CODE

(75) Inventor: Takeshi Matsushima, Kariya (JP)

(73) Assignee: Denso Wave Incorporated, Tokyo (JP)

( * ) Notice: Subject to any disclaimer, the term of this patent is extended or adjusted under 35 U.S.C. 154(b) by 444 days.

(21) Appl. No.: 12/149,277

(22) Filed: Apr. 30, 2008

(65) Prior Publication Data

US 2009/0039161 A1    Feb. 12, 2009

(30) Foreign Application Priority Data

Aug. 6, 2007    (JP) .............................. 2007-204228

(51) Int. Cl.
*G06K 7/10* (2006.01)
*G06K 7/14* (2006.01)

(52) U.S. Cl. ........................ 235/454; 235/455; 235/494

(58) Field of Classification Search ................ 235/454, 235/494, 455, 462.06, 462.17
See application file for complete search history.

(56) References Cited

U.S. PATENT DOCUMENTS

2002/0048248 A1* 4/2002 Nakao ................... 369/112.12

2003/0168512 A1* 9/2003 Longacre et al. ............ 235/454
2009/0145968 A1* 6/2009 Kabeya .................. 235/462.01

FOREIGN PATENT DOCUMENTS

JP      A-2006-330987      12/2006

* cited by examiner

*Primary Examiner*—Edwyn Labaze
(74) *Attorney, Agent, or Firm*—Posz Law Group, PLC

(57) ABSTRACT

An information reader has a light source, an optical system having a light receiving sensor and a lens, and a board supporting the source and sensor such that a sensor axis of the sensor perpendicular to the sensor and passing an intersection of an optical axis of the optical system and the sensor is parallel to an emission axis of the source. A positional relation among the lens, sensor and source satisfies a distance Di between the lens and sensor, a distance Da between an optical axis of the lens and the axis of the source, and a distance Do between the lens and a readable area. The axis of the sensor is shifted from the optical axis of the lens by an offset value $F=Da \times Di/Do$ in a direction away from the source. The reader optically reads a code placed in the readable area.

14 Claims, 10 Drawing Sheets

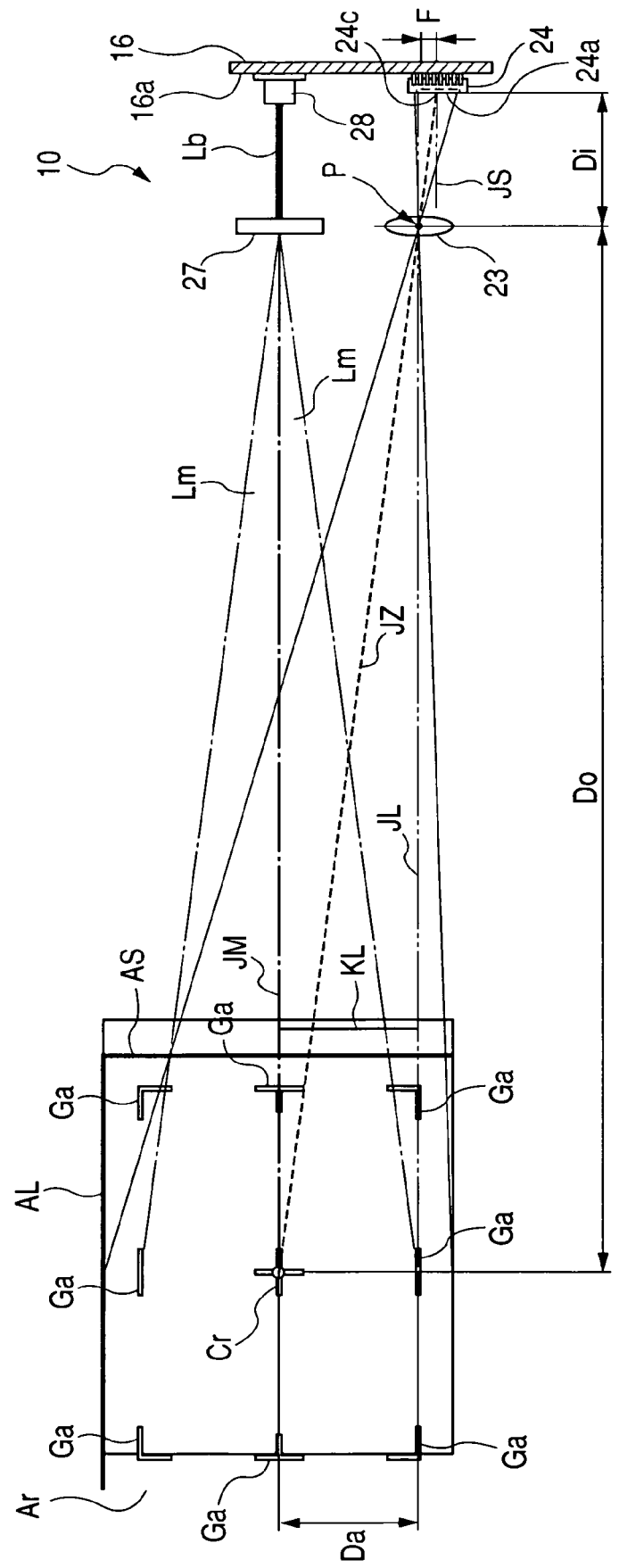

INFORMATION READER FOR OPTICALLY READING CODE

CROSS-REFERENCE TO RELATED APPLICATION

This application is based upon and claims the benefit of priority of the prior Japanese Patent Application 2007-204228 filed on Aug. 6, 2007 so that the contents of which are incorporated herein by reference.

BACKGROUND OF THE INVENTION

1. Field of the Invention

The present invention relates to an information reader for emitting marker light to a display medium to light up an information code of the medium placed in a readable area of the reader and to position the reader over the medium such that the reader can optically read the information code by illuminating the information code of the medium with illumination light.

2. Description of Related Art

To record information on an article such as a commercial article or the like, an information code is marked in a code area of a display medium attached to the article. This information code is optically read out by an information reader. That is, the reader initially emits marker light having images of a plurality of guide markers. A user directs the reader toward the medium so as to light up the information code of the medium placed in a readable area of the reader using the marker light, and the user places the center of the marker light indicated by the guide markers at the center of the information code. Therefore, the reader is positioned over the medium such that an image of the information code can be appropriately formed in a light receiving system of the reader. That is, the reader is focused on the medium. Then, the reader emits illumination light to the medium, and the light reflected from the medium is received in the light receiving system. Therefore, the reader can optically read the information code of the medium.

This reader is, for example, disclosed in Published Japanese Patent First Publication No. 2006-330987. In this Publication, an information reader has a marker optical system and a light receiving optical system. A marker light source of the marker optical system emits marker light to an object (i.e., display medium) along an optical axis of the marker optical system to appropriately position the reader over the object. In the light receiving optical system, a light receiving axis of the optical system coincides with the optical axis of an image forming lens and intersects the surface of a light receiving sensor at right angles. The lens converges illumination light reflected from the object onto a surface of the sensor.

The optical systems are disposed such that the optical axis of the marker optical system and the light receiving axis of the light receiving optical system cross at an intersection at a small angle. The distance between the reader and the intersection is set to a reading distance appropriate to the reader. When a user places the reader over the object at the reading distance, an image of an information code marked on the object is formed on the surface of the sensor. Therefore, the reader can read the information code from the image. To arrange the optical systems having axes crossing each other in the reader, an optical element including the light source in the marker optical system is disposed on the upper side of the lens of the light receiving optical system so as to be inclined to the lower direction. In this structure, the optical element of the marker optical system is inevitably disposed in the reader to be inclined with respect to an optical element (i.e., sensor and lens) of the light receiving optical system.

However, to arrange the optical systems of the optical systems inclined each other such that the axes of the optical systems cross at a small angle, it is required to attach the optical elements to respective supporting members (e.g., printed wiring boards). Alternatively, when the optical elements are attached to the same supporting member, it is required that one of the optical elements is indirectly attached to the supporting member through a spacer or the like. Therefore, the number of parts and the number of assembling processes required for the reader are undesirably increased. Further, it is required to minutely adjust the orientation of at least one of the optical elements. Therefore, an adjusting process for the optical systems is inevitably required.

SUMMARY OF THE INVENTION

An object of the present invention is to provide, with due consideration to the drawbacks of the conventional information reader, an information reader wherein a marker optical system and a light receiving optical system are easily disposed in a simplified structure such that the reader is appropriately positioned over a display medium by using marker light emitted from the marker optical system and such that light optically reflected from the display medium while reading an information code of the display medium is received in the light receiving optical system.

According to an aspect of this invention, the object is achieved by the provision of an information reader comprising a light receiving optical system for setting a readable area, a marker light source for emitting marker light to a display medium along a light emission axis of the marker light source to place the display medium in the readable area, and a supporting member for supporting the marker light source and the light receiving optical system such that the sensor axis of the light receiving sensor and the light emission axis of the marker light source are substantially parallel to each other. The optical system receives image forming light from the display medium placed in the readable area and forms a code image from the image forming light to optically read, from the code image, an information code marked on the display medium. The optical system comprises a light receiving sensor that receives the image forming light and forms the code image on an image forming surface of the sensor, and a lens that converges the image forming light onto the image forming surface of the light receiving sensor. A sensor axis of the sensor is perpendicular to the image forming surface and substantially passes through an intersection of an optical axis of the light receiving optical system and the image forming surface. A principal point of the lens is away from the readable area by an object point distance Do and is away from the image forming surface of the light receiving sensor by an image point distance Di. An optical axis of the lens and the light emission axis of the marker light source are separated by an inter-axis distance Da. The sensor axis of the light receiving sensor is differentiated from the optical axis of the lens by an offset value F satisfying a relationship of $F = Da \times Di/Do$ such that the sensor axis of the light receiving sensor is shifted from the optical axis of the lens in a direction away from the marker light source.

With this structure of the information reader, the optical axis of the optical system passes through the center of the readable area. Therefore, an image of an object placed in the readable area can be formed on the surface of the sensor at an object-image distance equal to a sum Di+Do of the image point distance Di and the object point distance Do at the magnification Di/Do. Further, although the sensor axis of the light receiving sensor and the light emission axis of the marker light source are substantially parallel to each other, the offset value F=Da×Di/Do is set such that the light emission axis of the marker light source meets the optical axis of the optical system in the readable area.

With this positional relation among the light source, the lens and the sensor, when the position and orientation of the reader are set so as to emit the marker light to the display medium at an appropriate distance between the reader and the display medium (i.e., approximately the distance Do between the lens and the display medium), the display medium is placed in the readable area, and the optical axis of the optical system intersecting the axis of the marker light source in the readable area is placed on the display medium. Therefore, an image of an information code marked in the display medium is formed on the surface of the sensor. In this image formation, because a portion of the code placed on the axis of the marker light source is also placed on the optical axis of the optical system, an image of the portion of the code is formed on a portion of the image forming surface intersecting the optical axis of the optical system. Therefore, the whole image of the code can be reliably formed on the surface of the sensor, so that the information reader can read the whole information code from the image.

Accordingly, because the sensor and the marker light source are supported by the supporting member without crossing the axis of the sensor and the light emission axis of the marker light source, it is not required that the source and the sensor are attached to respective supporting members, nor is it required that a spacer is additionally placed between the supporting member and one of the source and the sensor.

In this case, the source of a marker optical system and the sensor of the light receiving optical system can be easily disposed in the information reader in a simplified structure, and the number of assembling processes and the number of adjusting processes required for the manufacturing of the information reader can be reduced as well as the reduction in the number of parts required for the information reader.

According to another aspect of this invention, the object is achieved by the provision of an information reader comprising a first light receiving optical system for setting a readable area, a second light receiving optical system, a marker light source for emitting marker light to a display medium along a light emission axis of the marker light source to place the display medium in the readable area, and a supporting member for supporting the marker light source and the first and second light receiving optical systems. The first light receiving optical system receives first image forming light from the display medium placed in the readable area and forms a first code image from the first image forming light to optically read, from the first code image, an information code marked on the display medium. The second light receiving optical system receives second image forming light from the display medium placed in the readable area and forms a second code image from the second image forming light to optically read, from the second code image, the information code. The first light receiving optical system comprises a first light receiving sensor that receives the first image forming light to form the first code image on an image forming surface of the first light receiving sensor, and a first lens that converges the first image forming light onto the image forming surface of the first light receiving sensor. A sensor axis of the first light receiving sensor substantially passes through an intersection of an optical axis of the first light receiving optical system and the image forming surface and is perpendicular to the image forming surface. A principal point of the first lens is away from the readable area by a first object point distance Do1 and is away from the image forming surface of the first light receiving sensor by a first image point distance Di1. The second light receiving optical system comprises a second light receiving sensor that receives the second image forming light to form the second code image on an image forming surface of the second light receiving sensor, and a second lens that converges the second image forming light onto the image forming surface of the second light receiving sensor. A sensor axis of the second light receiving sensor substantially passes through an intersection of an optical axis of the second light receiving optical system and the image forming surface of the second light receiving sensor and is perpendicular to the image forming surface of the second light receiving sensor. A principal point of the second lens is away from the readable area by a second object point distance Do2 and is away from the image forming surface of the second light receiving sensor by a second image point distance Di2. The supporting member supports the marker light source, the first light receiving sensor and the second light receiving sensor such that the sensor axes of the first and second light receiving sensors and the light emission axis of the marker light source are substantially parallel to one another. An optical axis of the first lens and the light emission axis of the marker light source are separated by a first inter-axis distance Da1, and an optical axis of the second lens and the light emission axis of the marker light source are separated by a second inter-axis distance Da2. The sensor axis of the first light receiving sensor is differentiated from the optical axis of the first lens by a first offset value F1 satisfying a relationship of F1=Da1×Di1/Do1 such that the sensor axis of the first light receiving sensor is shifted from the optical axis of the first lens in a direction away from the marker light source. The sensor axis of the second light receiving sensor is differentiated from the optical axis of the second lens by a second offset value F2 satisfying a relationship of F2=Da2×Di2/Do2 such that the sensor axis of the second light receiving sensor is shifted from the optical axis of the second lens in a direction away from the marker light source.

With this structure of the information reader, the optical axes of the first and second optical systems pass through the center of the readable area. Therefore, an image of an object placed in the readable area can be formed on the surface of the first light receiving sensor at an object-image distance equal to a sum of the distances Di1 and Do1 at the magnification Di1/Do1 and can also be formed on the surface of the second light receiving sensor at an object-image distance equal to a sum of the distances Di2 and Do2 at the magnification Di2/Do2. Further, although the sensor axes of the sensors and the light emission axis of the source are substantially parallel to one another, the offset value F1=Da1×Di1/Do1 is set such that the light emission axis of the marker light source meets the optical axis of the first optical system in the readable area, and the offset value F2=Da2×Di2/Do2 is set such that the light emission axis of the marker light source meets the optical axis of the second optical system in the readable area.

With this positional relation among the light source, the lenses and the sensors, when the position and orientation of the reader are set so as to emit the marker light to the display medium at an appropriate distance between the reader and the display medium (i.e., approximately the distance Do1 between the first lens and the display medium), the display medium is placed in the readable area, and the optical axes of the first and second optical systems intersecting the axis of the marker light source in the readable area are placed on the display medium. Therefore, an image of an information code marked in the display medium is formed on the surface of the first sensor, and another image of the information code is formed on the surface of the second sensor.

In this image formation, a portion of the code placed on the axis of the marker light source is also placed on the optical axes of the optical systems, so that an image of the code portion is formed on both a portion of the surface of the first sensor intersecting the optical axis of the first optical system and a portion of the surface of the second sensor intersecting the optical axis of the second optical system. Therefore, the whole image of the code can be reliably formed on the surface of each sensor, so that the information reader can read the whole information code from the images.

Accordingly, because the sensors and the source are supported by the supporting member without crossing the axes of the sensors and the axis of the source, it is not required that the source and the sensors are attached to respective supporting members, nor is it required that a spacer is additionally placed between the supporting member and each of two optical elements among source and sensors.

In this case, the source of a marker optical system and the sensors of the light receiving optical systems can be easily disposed in the information reader in a simplified structure, and the number of assembling processes and the number of adjusting processes required for the manufacturing of the information reader can be reduced as well as the reduction in the number of parts required for the information reader.

BRIEF DESCRIPTION OF THE DRAWINGS

FIG. 5 is an explanatory view showing the positional relationship between a light receiving optical system and a marker light optical system in the code reader shown in FIG. 1A;

DETAILED DESCRIPTION OF THE PREFERRED EMBODIMENTS

Figure 1A:
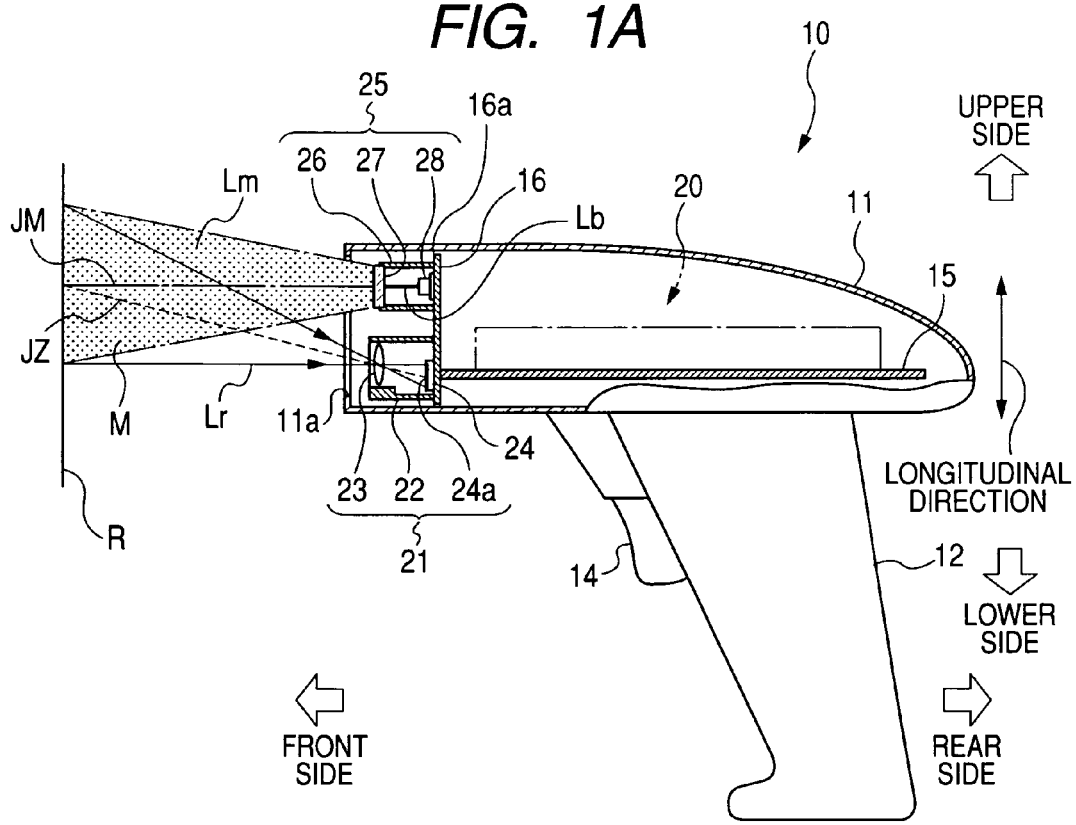
FIG. 1A is a side view, partially in cross-section, of a two-dimensional code reader according to the first embodiment of the present invention.

Embodiments of the present invention will now be described with reference to the accompanying drawings, in which like reference numerals indicate like parts, members or elements throughout the specification unless otherwise indicated.

Embodiment 1

Figure 1B:
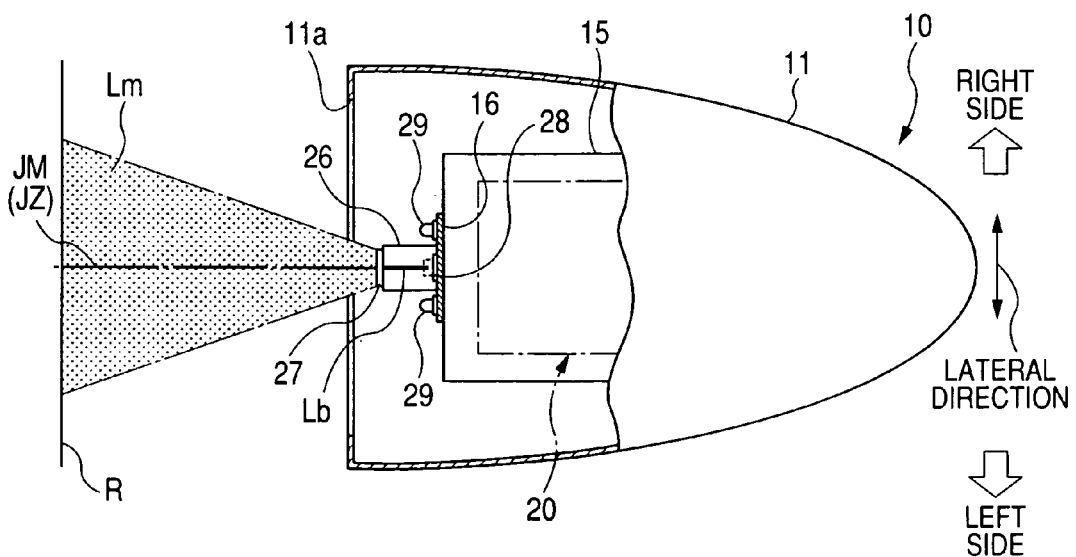
FIG. 1B is a top view, partially in cross-section, of the code reader shown in FIG. 1A.
Figure 2:
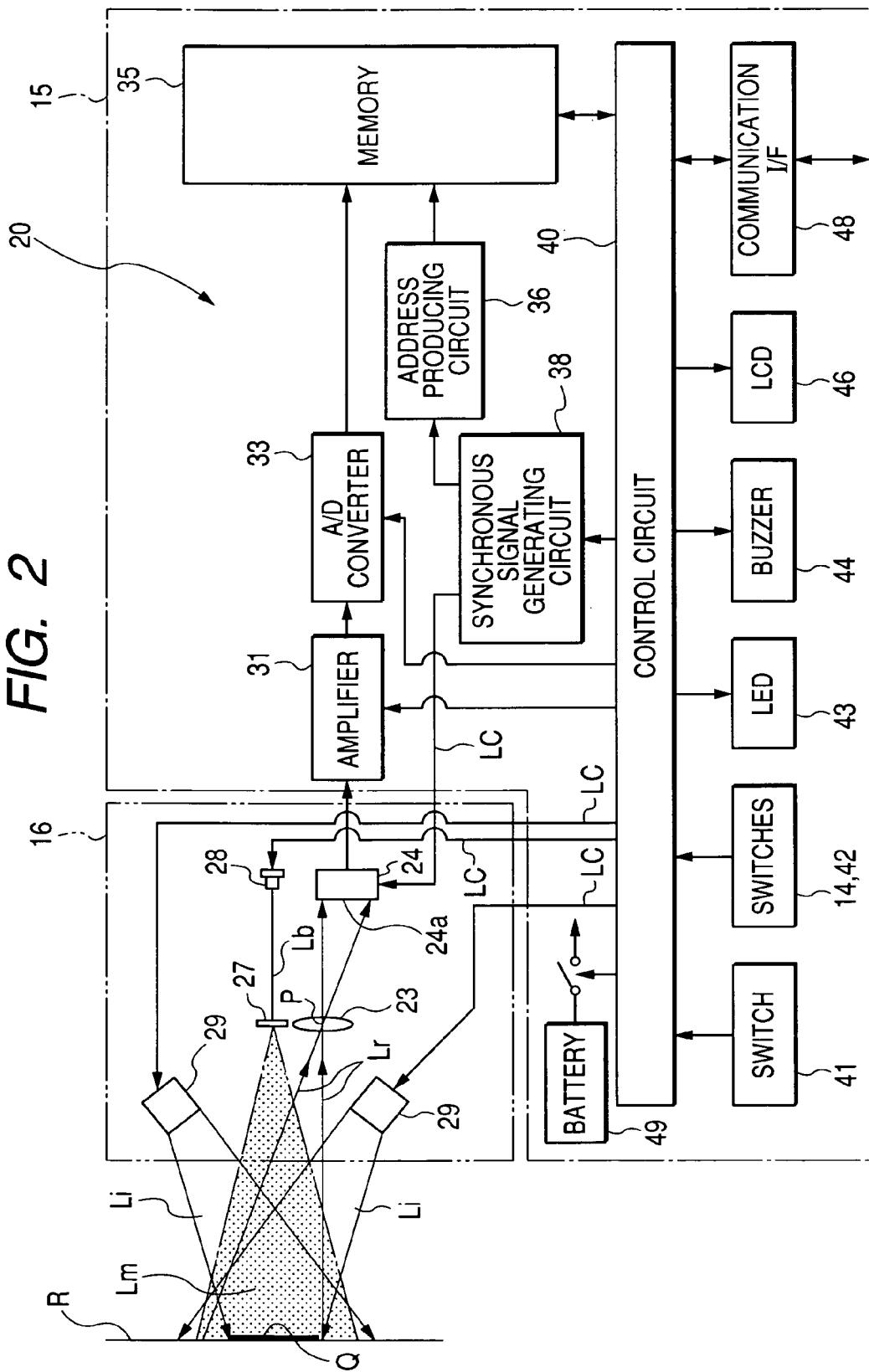
FIG. 2 is a view showing a structure of optical systems and a block diagram of a micro-computer system in the code reader shown in FIG. 1A.

FIG. 1A is a side view, partially in cross-section, of a two-dimensional code reader according to the first embodiment, and FIG. 1B is a top view, partially in cross-section, of the code reader. FIG. 2 is a view showing a structure of an optical system and a block diagram of a micro-computer system in the code reader. The emission direction of marker light is called the front direction of the reader, and left and right sides of the reader are defined when the reader is seen along the front direction.

A handy gun type two-dimensional code reader 10 shown in FIG. 1A and FIG. 1B represents an information reader according to the present invention. As shown in FIG. 1A, FIG. 1B and FIG. 2, the code reader 10 has a housing body 11 made round in a rectangular thinned box shape, and a cylindrical grip 12 attached to a bottom portion of the body 11 on a rear side of the reader 10 so as to be integrally formed with the body 11. The body 11 and grip 12 form the reader 10 in a gun shape. The grip 12 has a specific outer diameter such that a user can grasp the grip 12 with his or her hand. A trigger switch 14 is attached to an upper portion of the grip 12 such that a forefinger of the user holding the grip 12 is placed on the switch 14.

The body 11 accommodates a marker optical system 25 for outputting marker light Lm, a plurality of illumination light sources 29 for emitting beams of illumination light Li, a light receiving optical system 21 for receiving image forming light Lr (see FIG. 2) reflected from a read object R, and a micro-computer system 20 for detecting information of a code marked on the object R from the light Lr. An illumination optical system is composed of the sources 29. The body 11 further has a single printed wiring board (or supporting member) 16 and a micro-computer system unit board 15. The optical systems 21 and 25 and the light sources 29 are disposed on the board 16, and the marker optical system 25 is placed on the upper side of the optical system 21. Therefore, the board 16 is formed in a rectangular shape lengthened along the longitudinal direction of the reader 10. The system 20 is mounted on the board 15.

The body 11 further has a reading opening 11a on the front end of the body 11. The marker light Lm outputted from the marker optical system 25 passes through the opening 11a and lights up the read object (or display medium) R to cause a user to position the reader 10 over the object R at an appropriate distance. The illumination light emitted from the light sources 29 passes through the opening 11a and is reflected from the read object R to form image forming light Lr. The image forming light Lr passes through the opening 11a so as to be received in the optical system 21. A two-dimensional code Q representing an information code is marked on the object R. The code Q is selected from QR (quick response) code, Data Matrix, Maxi code, PDF417, Veri code, CP code, Calra code and the like. The light Lr is processed in the micro-computer system 20 to detect the code from the light Lr, so that the reader 10 optically reads the code from the object R.

Figure 3A:
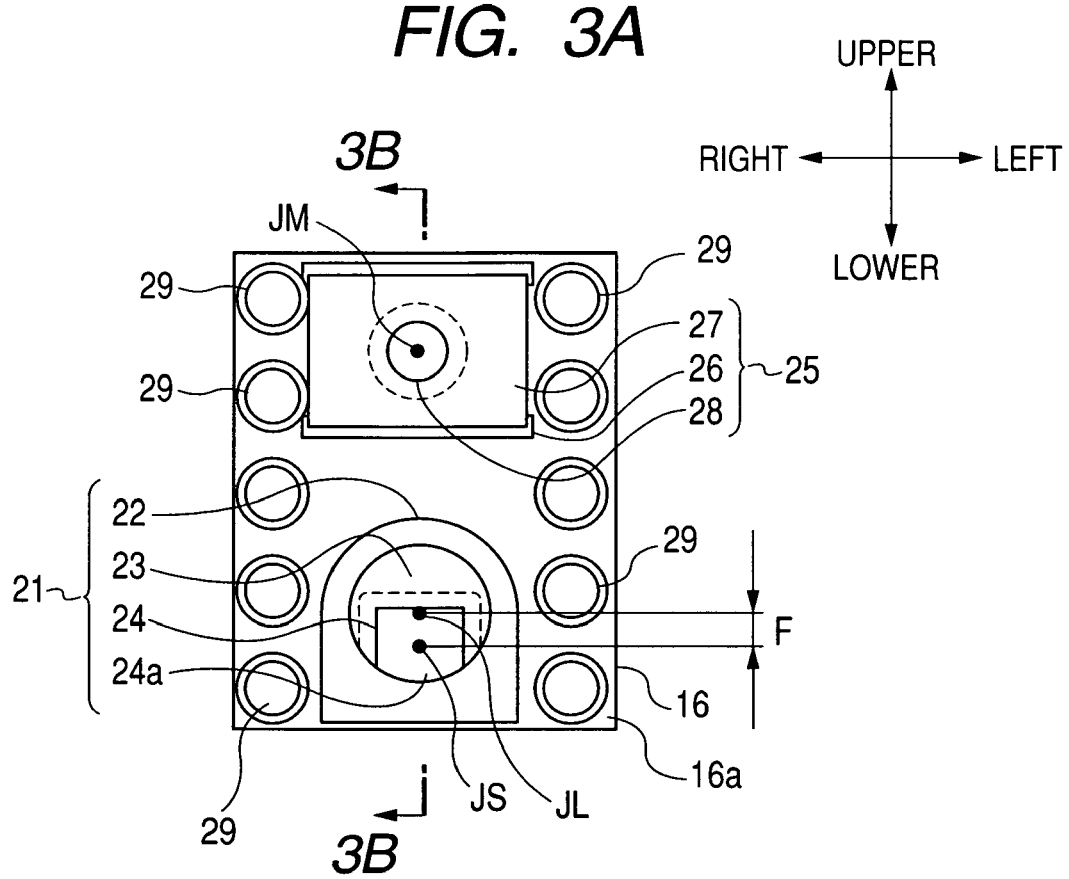
FIG. 3A is a partial front view of the code reader shown in FIG. 1A.
Figure 3B:
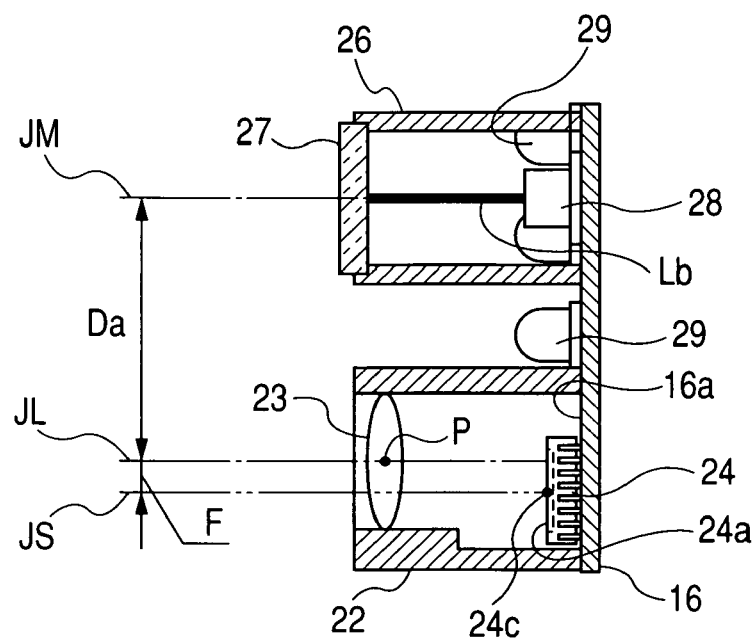
FIG. 3B is a sectional view taken substantially along line 3B-3B of FIG. 3A.

FIG. 3A is a front view of the code reader 10 when the opening 11a is seen from the front side, and FIG. 3B is a sectional view taken substantially along line 3B-3B of FIG. 3A.

As shown in FIG. 1A, FIG. 1B, FIG. 2, FIG. 3A and FIG. 3B, the marker optical system 25 has a marker light source 28 fixedly attached to a flat surface 16a of the board 16 so as to emit a laser beam Lb along a light emission axis JM of the light source 28, a cylindrical holder 26 attached to the surface 16a of the board 16 so as to surround the light source 28, and a hologram 27 supported by the holder 26. The light source 28 is, for example, formed of a laser diode such as InGaAlP laser or the like. The hologram 27 is formed of a rectangular hologram plate having a diffraction grating. Because the two-dimensional code Q is formed in a rectangular shape, the hologram plate is also formed in a rectangular shape such that each of longer sides of the plate extends along the lateral direction of the reader 10.

The light source 28 is disposed on the board 16 such that the axis JM of the light source 28 is substantially perpendicular to the surface 16a of the board 16 (see FIG. 3B). That is, a bottom surface of the light source 28 is directly attached to the board 16 without using any spacer between the source 28 and the board 16, so that the axis JM becomes substantially perpendicular to the surface 16a of the board 16. The hologram 27 diffracts the laser beam Lb emitted from the light source 28 and forms beams of marker light Lm diffused around the axis JM in a rectangular shape. The marker light Lm has images of a plurality of guide markers and is outputted from the reader 10 while the axis JM is approximately placed at the center of the marker light Lm.

Each of the illumination light sources 29 shown in FIG. 1B, FIG. 2 and FIG. 3A is formed of a red light emitting diode (LED). In this embodiment, five LEDs are disposed on the board 16 in a line to be placed on the left side of the optical systems 21 and 25, and another five LEDs are disposed on the board 16 in a line to be placed on the right side of the optical systems 21 and 25. Beams of illumination light Li emitted from the light sources 29 are diffused in a diffusion lens or the like (not shown) and are reflected on the object R to form beams of image forming light Lr. The image forming light Lr is received in the optical system 21 to read information of the code Q from the light Lr.

The optical system 21 shown in FIG. 1A, FIG. 2, FIG. 3A and FIG. 3B has an image forming lens 23 set at a focal length Lf, an image pickup sensor 24 fixedly attached to the surface 16a of the board 16, and a lens-barrel 22 standing on the surface 16a of the board 16 so as to support the lens 23 while surrounding the sensor 24. The sensor 24 is formed of several millions of solid imaging devices such as C-MOS or charge coupled devices (CCD), so that an image forming surface 24a is formed on the sensor 24. Because the two-dimensional code Q is formed in a rectangular shape, a group of the solid imaging devices is disposed in a rectangular shape so as to form the surface 24a in the rectangular shape on the sensor 24. The surface 24a has longer sides extending along the lateral direction of the reader 10. That is, the sensor 24 acts like a so-called area sensor. Therefore, the sensor 24 can form, on the surface 24a, a two-dimensional (i.e., rectangular) image carried by the light Lr. The sensor 24 may be formed of a single area sensor having an image forming surface formed in a square shape so as to form a rectangular image of the code Q on the surface.

The lens 23 receives image forming light Lr reflected from the object R and converges the light Lr onto the surface 24a of the sensor 24. The orientation of the lens 23 is, for example, set such that an optical axis (i.e., lens axis) JL of the lens 23 passing through the principal point (i.e., center) P of the lens 23 substantially becomes perpendicular to the surface 24a of the sensor 24 (see FIG. 3B).

An optical axis JZ (see FIG. 1A) of the light receiving optical system 21 passing through the principal point P of the lens 23 intersects the surface 24a of the sensor 24 at a light receiving point 24c. A sensor axis JS of the sensor 24 is defined so as to be perpendicular to the surface 24a and pass through the point 24c of the surface 24a. The point 24c of the surface 24a is, for example, placed at the intersection of two diagonal lines of the rectangular-shaped surface 24a. However, the point 24c of the surface 24a may be differentiated from the center of the surface 24a. The orientation of the sensor 24 is set on the board 16 such that the axis JS of the sensor 24 is substantially perpendicular to the surface 16a of the board 16 (see FIG. 3B). That is, a bottom surface of the sensor 24 opposite to the surface 24a is directly attached to the board 16 without using any spacer between the sensor 24 and the board 16, so that the axis JS substantially becomes perpendicular to the surface 16a of the board 16. Therefore, the axis JL of the lens 23 and the axis JS of the sensor 24 are substantially parallel to the axis JM of the light source 28, and the axes JS and JM are placed on the same plane.

The sensor 24 is disposed on the board 16 such that the sensor 24 can be seen from the outside of the body 11 through the opening 11a. Further, the sensor 24 is positioned such that the point 24c of the surface 24a is shifted from the optical axis JL of the lens 23 towards the lower side of the reader 10 by an offset value F so as to be further away from the source 28. That is, the axis JS of the sensor 24 is shifted from the optical axis JL of the lens 23 by the offset value F toward the lower side opposite to the side of the source 28. Therefore, the axes JM, JS and JL are placed on the same plane. Because the axes JM, JS and JL are placed on the same plane, the axes JM and JZ are placed on the same plane, so that the axis JM crosses the optical axis JZ of the optical system 21 (see FIG. 4). Further, because the point 24c of the surface 24a is shifted from the optical axis JL of the lens 23, the optical axis JZ (see FIG. 1A) of the light receiving optical system 21 slantingly meets the surface 24a of the sensor 24.

A positional relationship between the axis JM of the marker optical system 25 and the optical axis JZ of the optical system 21 will now be described in more detail with reference to FIG. 4.

Figure 4:
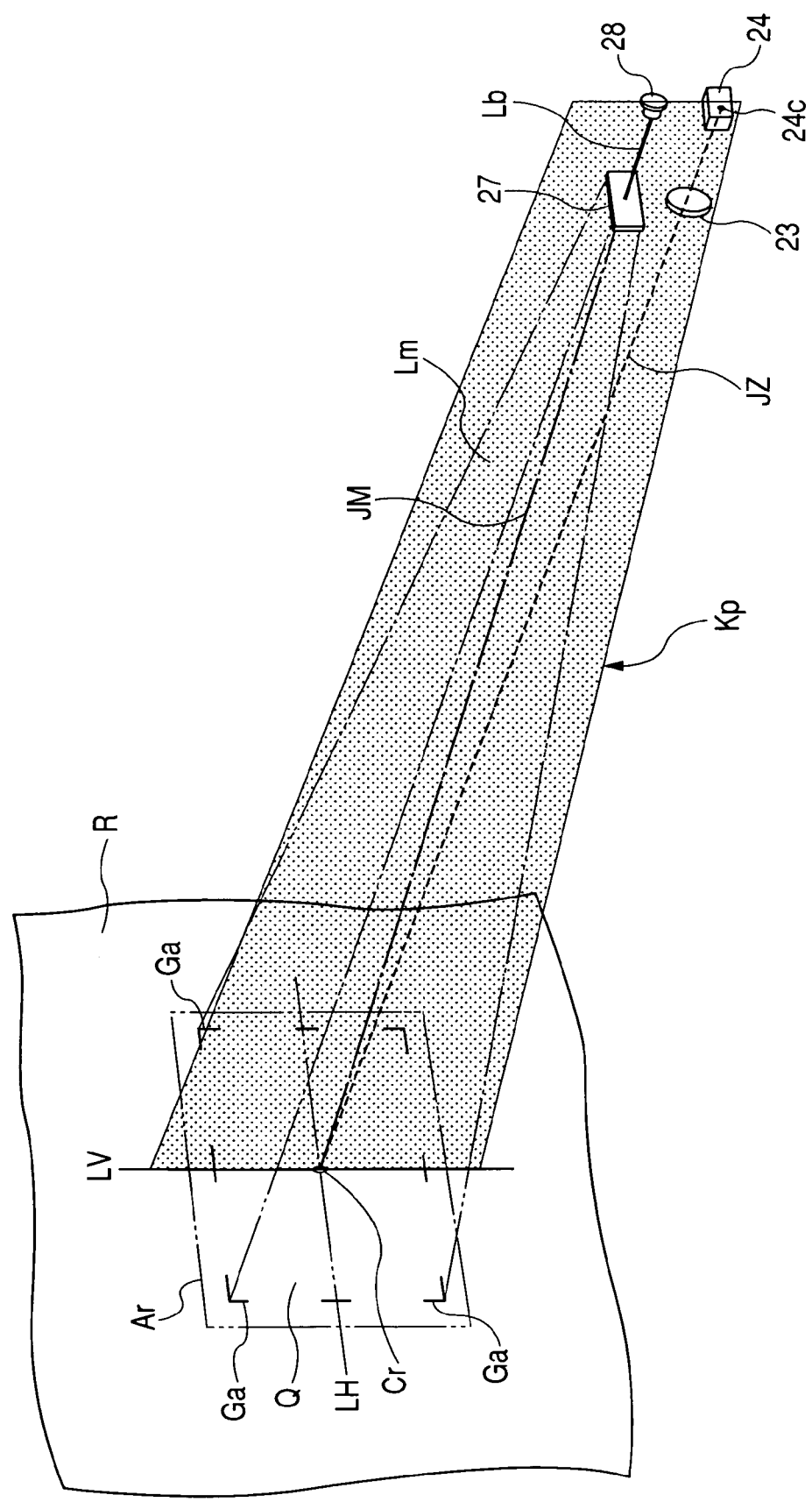
FIG. 4 is an explanatory view showing the positional relationship between a light emitting axis of a marker optical system and an optical axis of a reading optical system in the code reader shown in FIG. 1A.

As shown in FIG. 4, the optical system 21 sets a readable area Ar of the reader 10 at a certain distance from the reader 10. The optical axis JZ of the optical system 21 crosses a reading center Cr of the area Ar at right angles. When the object R is placed in the readable area Ar, light being reflected from the object R and being incident on the lens 23 is converged on the surface 24a of the sensor 24 and is in focus, and light being reflected at the center Cr of the area Ar and going around the optical axis JZ is converged on the point 24c of the surface 24a of the sensor 24. Because the surface 24a of the sensor 24 is formed in the rectangular shape, the system 21 forms the area Ar in a rectangular shape having longer sides extending along the lateral direction of the reader 10. The offset value F is set such that the axis JM of the marker light source 28 meets the optical axis JZ of the optical system 21 in the area Ar. That is, the axis JM passes through the center Cr of the area Ar, and the axes JM and JZ meet each other at the center Cr of the area Ar.

The marker optical system 25 intermittently outputs marker light Lm to the object R to light up the object R. The distance between the reader 10 and the object R is set to approximately place the object R in the readable area Ar. The orientation of the reader 10 is set to direct longer sides of the marker light Lm formed in the rectangular shape in parallel to longer sides of the code area and to approximately place the center of the marker light Lm (i.e., center Cr of the reading area Ar) at the center of a code area of the object R. The marker light Lm has images of a plurality of guide markers Ga placed in the outer circumferential area of the light Lm, so that the guide markers Ga are drawn in the periphery of the code area of the object R. A user can easily visualize both a longitudinal center line LV and a lateral center line LH from the guide markers Ga to recognize an intersection of the lines LV and LH as the center Cr of the readable area Ar.

Therefore, when the position and orientation of the reader 10 are appropriately adjusted based on the marker light Lm to place the intersection of the lines LV and LH on the center of the code area, the optical axis JZ of the optical system 21 crosses the center of the code area. Because the source 28 is placed on the upper side of the sensor 24, the line LV of the code area is placed in a plane Kp in which the axes JZ and JM are placed together. Therefore, when illumination light Li emitted from the light sources 29 is reflected from the center of the code area placed at the center Cr of the readable area Ar to form image forming light Lr going around the optical axis JZ, the light Lr can be converged on the point 24c of the surface 24a through the lens 23. That is, when illumination light Li is reflected from the code area to form image forming light Lr, the light Lr can be converged on the surface 24a of the sensor 24.

A positional relationship among the source 28, the lens 23 and the sensor 24 is described below with reference to FIG. 5.

As shown in FIG. 5, the reader 10 is configured so as to have an inter-axis distance Da between the axis JM of the light source 28 and the axis JL of the lens 23, an object point distance Do between the readable area Ar and the principal point P of the lens 23, an image point distance Di between the principal point P of the lens 23 and the surface 24a of the sensor 24, and the offset value F between the axis JL and the point 24c of the surface 24a of the sensor 24. The distance Do is determined from the distance Di and the focal length Lf of the lens 23 so as to satisfy an in-focus relationship of $1/Di+1/Do=1/Lf$. The offset value F is set to satisfy a relationship of $F=Da \times Di/Do$. The value Di/Do denotes the magnification of the lens 23.

Therefore, the optical axis JZ of the optical system 21 crosses the surface 24a of the sensor 24 at the point 24c which is shifted from the optical axis JL of the lens 23 by the offset F ($=Da \times Di/Do$) in the lower direction so as to be away from the marker light source 28. Further, the axis JM of the light source 28 crosses the center Cr of the readable area Ar placed on the optical axis JZ of the optical system 21. When the object R is placed in the readable area Rr so as to hold the optical conjugate relation (i.e., in-focus relationship) between an object point and an image point, The object-image distance between the two-dimensional code Q of the object R and an image formed on the surface 24a of the sensor 24 becomes equal to the sum Do+Di of the distance Do and the distance Di.

Therefore, because of the axis JS of the sensor 24 differentiated from the optical axis JL of the lens 23 by the offset value F, even when the source 28 and the sensor 24 are attached to the board 16 in a positional relationship that the axis JM of the source 28 is parallel to the axis JS of the sensor 24 (see FIG. 3B), the axis JM of the source 28 can be set to pass through the center Cr of the reading area Ar on which the optical axis JZ of the optical system 21 passing through the principal point P of the lens 23 and the point 24c of the sensor 24 is placed. That is, with the structure of the reader 10 disposed so that the source 28, the lens 23 and the sensor 24 are disposed on the board 16 such that the axis JM of the source 28 does not cross the axis JS of the sensor 24 at any angle, then when a user places the reading area Ar on the object R so as to place the center Cr of the reading area Ar indicated by the guide markers Ga at the center of the two-dimensional code Q of the object R, the optical axis JZ of the optical system 21 can be placed on the center of the code Q at the object-image distance D01+Di1.

In the manufacture of the reader 10, to directly attach the source 28 and the sensor 24 to the board 16, a mounting apparatus for automatically mounting electric parts into an electric apparatus is used. Therefore, the source 28 and the sensor 24 can be independently positioned by the mounting apparatus with high precision. Further, because the lens 23 is fixed to the lens-barrel 22 directly attached to the board 16, the lens 23, the sensor 24 and the source 28 can be independently positioned with high precision. Accordingly, it is not required to minutely adjust the positional relationship among the lens 23, the sensor 24 and the source 28.

Therefore, it is not required that the optical system 21 having the lens-barrel 22, the lens 23 and the sensor 24 is attached to a supporting member (e.g., sub-substrate, or a supporting post or a convex portion extending from the inner wall of the body 11) different from another supporting member to which the marker optical system 25 having the holder 26, the hologram 27 and the source 28 is attached. Further, it is not required that at least one of the sensor 24 and the source 28 is indirectly attached to the board 16 through a spacer or the like to dispose the one of the sensor 24 and the source 28 at a small angle with respect to the surface 16a of the board 16.

With this structure of the sensor 24 and the source 28 directly attached to the board 16, the number of assembling processes and the number of adjusting processes required for the manufacturing of the reader 10 can be reduced as well as the reduction in the number of parts required for the reader 10. That is, the marker optical system 25 and the light receiving optical system 21 can be easily disposed in a simplified structure.

Returning to FIG. 2, the micro-computer system 20 has an amplifier 31 for amplifying the level of a detection signal indicating the code, an analog-to-digital converter 33 for converting the analog level of the amplified signal into digital data, a synchronous signal generating circuit 38 for generating a synchronous signal to receive the detection signal in the sensor 24 in synchronization with each pulse of the synchronous signal, an address producing circuit 36 for producing an address in synchronization with each pulse of the synchronous signal, a memory 35 for storing the digital data at the address, a power source switch 41, the trigger switch 14, operation switches 42, a light emitting diode (LED) 43 acting as an indicator, a buzzer 44 generating a beep or alarm sound, a liquid crystal display (LCD) 46 for displaying information of the code, a communication interface (I/F) 48, a battery 49 and a control circuit 40 for controlling all units of the system 20.

With this structure of the system 20, an image signal indicating an image of the code Q formed on the surface 24a of the sensor 24 is amplified in the amplifier 31 at a predetermined gain. The amplified signal is converted into digital image data in the converter 33. Further, an address is produced in the circuits 36 and 38 each time the image signal is transmitted to the system 20. Then, the image data are stored at the address in the memory 35.

The memory 35 is formed of a semiconductor memory having a random access memory (RAM) such as a dynamic RAM (DRAM) or a static RAM (SRAM), and a read only memory (ROM) such as an erasable and electrically programmable ROM (EPROM), an electrically erasable programmable ROM (EEPROM) or the like. The RAM has a working region for arithmetic calculations as well as a region for storing the image data. The ROM stores a predetermined program for the decoding process and system programs for controlling hardware such as the sensor 24, and the light sources 28 and 29.

The control unit 40 is formed of a microcomputer with a central processing unit (CPU), a system bus and an input-output interface to control the reader 10. The unit 40 and the memory 35 compose an information processor and have an information processing function. The unit 40 is connected with various units such as the amplifier 31, the circuits 33 and 38, the memory 35 and peripheral circuits (switches 14, 41 and 42, LED 43, buzzer 44, LCD 46 and interface 48) through the input-output interface. The unit 40 detects on-off operations of the switches 14, 41 and 42. The unit 40 controls the LED 43 to turn on or off. The unit 4 controls the buzzer 44 to output a beep or alarm sound. The unit 40 controls the display 46 to display the information code Q. The unit 40 controls the interface 48 to perform serial communication with external units (not shown) such as a host computer of a host system. When the unit 40 detects the turn-on of the switch 41, the unit 40 supplies driving electric power from the battery 49 to each of the circuits and elements of the reader 10. When the unit 40 detects the turn-off of the switch 41, the unit 40 stops supplying the power. The battery 49 is formed of a secondary battery such as a lithium ion battery generating a direct current voltage.

With this structure of the reader 10, when a user turns on the switch 41, self-diagnosis processing is automatically performed for the reader 10 under control of the unit 40. When this processing is normally completed without any problems, the unit 40 automatically puts the reader 10 into a code reading mode. Then, the unit 40 outputs a marker light emission signal to the marker light source 28 in a predetermined cycle based on a synchronization signal. Further, the unit 40 waits for a switch-on of the trigger switch 14.

When receiving the emission signal, the light source 28 formed of a laser diode intermittently emits a laser beam, and the hologram 27 forms, from the laser beam, marker light Lm diffused in a rectangular shape The marker light Lm is outputted along the axis JM of the source 28. Therefore, when a user directs the opening 11a of the reader 10 toward the code area of the object R, the code area of the object R is lighted up by the marker light Lm. Therefore, as shown in FIG. 4, the user can clearly view and recognize a two-dimensional code Q marked on the object R.

When the user adjusts the position and orientation of the reader 10 so as to place the center of the marker light Lm (i.e., center Cr of readable area Ar) indicated by the markers GA at the center of the code area at an appropriate distance between the reader 10 and the object R, the center of the code Q is placed on the axis JM of the light receiving system 21 at the in-focus distance. Therefore, the positioning of the reader 10 over the code Q of the object R is completed so as to converge light reflected from the code Q onto the sensor 24 through the lens 23.

Thereafter, when the user turns on the switch 14, the unit 40 outputs an illumination light emitting signal to the light sources 29, so that the light sources 29 emit beams of illumination light Li to the code Q placed in the readable area Ar. Then, the illumination light Li is reflected from the code Q and is converged onto the sensor 24 through the lens 23. Because the axis JS of the sensor 24 is shifted from the optical axis JL of the lens 23 by the offset value F towards the direction away from the source 28, the whole image of the code Q is formed on the surface 24a of the sensor 24 such that the center portion of the code Q is formed approximately at the point 24c of the sensor 24. Then, in the system 20, an image signal corresponding to this image is processed to image data. The control circuit 40 decodes the image data to an information code and outputs the information code. Therefore, the reader 10 can optically read the code Q from the object R.

As described above, as shown in FIG. 1A to FIG. 5, the board 16 supports the marker light source 28 and the sensor 24 in the reader 10 such that the axis JM of the source 28 and the axis JS of the sensor 24 are parallel to each other, and the axis JS of the sensor 24 is differentiated from the optical axis JL of the lens 23 by the offset value F (=Da×Di/Do) such that the axis JS is shifted from the optical axis JL in a direction away from the source 28. The offset value equals a product of the inter-axis distance Da between the axis JM and the axis JL and the magnification Di/Do of the lens 23. That is, the axis JS of the sensor 24 is differentiated from the axis JM of the source 28 by a sum Da+F of the distance Da and the offset value F. The magnification Di/Do is expressed as the ratio of the image point distance Di (i.e., from the principal point P of the lens 23 to the surface 24a of the sensor 24) to the object point distance Do (i.e., from the readable area Ar to the principal point P of the lens 23). The distance Do satisfies an in-focus relationship of 1/DO+1/Di=1/Lf. The value Lf denotes the focal length of the lens 23.

Therefore, although the axis JM of the source 28 and the axis JS of the sensor 24 are set to be parallel to each other, a positional relationship between the source 28 and the optical system 21 can be set such that the axis JM of the source 28 meets the optical axis JZ of the optical system 21 at the center Cr of the readable area Ar. With this positional relationship, when the center of the marker light Lm is approximately placed at the center of the code area of the object R at an appropriate distance between the reader 10 and the object R, the center of the two-dimensional code Q can be placed approximately at the center Cr of the readable area Ar on which the optical axis JZ of the optical system 21 is placed. This means that it is not required that the axis JM and the axis JS of the sensor 24 cross each other. That is, it is not required that the source 28 and the sensor 24 are attached to respective supporting members, or it is not required that a spacer is additionally placed between the board 16 and one of the source 28 and the sensor 24 attached to the board 16.

Accordingly, the marker optical system 25 (especially, source 28) and the light receiving optical system 21 (especially, sensor 24) can be easily disposed in the reader 10 in a simplified structure, and the number of assembling processes and the number of adjusting processes required for the manufacturing of the reader 10 can be reduced as well as the reduction in the number of parts required for the reader 10.

Further, as shown in FIG. 5, the readable area Ar formed in the rectangular shape has longer sides AL and shorter sides AS. The positional relationship between the axis JM of the marker light source 28 and the optical axis JL of the lens 23 is set such that an imaginary line KL at right angles to both the optical axis JL and the axis JM is approximately parallel to the extending direction of the shorter side AS. In other words, the sensor 24 is disposed on the lower side of the light source 28 such that the axis JS of the sensor 24 is shifted from the axis JM of the source 28 by the distance Da+F in the lower direction approximately parallel to the shorter side AS. The distance Da is preferably set at a half of the length of the shorter side AS. In contrast, assuming that the sensor 24 is placed on the left or right side of the source 28 to place the imaginary line KL approximately in parallel to the longer side AL, the distance Da is set at a half of the length of the longer side AL. Therefore, as compared with the assuming case, the distance Da in this embodiment becomes shorter, so that the offset value F in this embodiment becomes lower. Accordingly, a smaller-sized information reader can be manufactured as compared with the assuming case. Further, although the thickness of the reader 10 along the longitudinal direction is increased by shifting the sensor 24 toward the lower side, the increase of the thickness in the reader 10 can be set at a small value.

Moreover, circuit leads Lc (see FIG. 2) extending from the control unit 40 and the circuit 38 are disposed on the substrate 16, and the circuit leads Lc are electrically connected with the source 28 and the sensor 24 attached to the substrate 16. Accordingly, as compared with a case where the source 28 and the sensor 24 are attached to respective supporting members, the wiring of the circuit leads can be simplified. That is, the number of assembling processes and the number of adjusting processes required for the manufacturing of the reader 10 can be further reduced as well as the reduction in the number of parts required for the reader 10.

In this embodiment, the source 28 of the marker optical system 25 is placed on the upper side of the sensor 24 of the optical system 21. However, the source 28 may be placed to be shifted from the sensor 24 in an arbitrary direction between the longitudinal direction and the lateral direction of the reader 10. In this case, the lens 23 and the sensor 24 are disposed such that the axis JS of the sensor 24 is shifted from the optical axis JL of the lens 23 in the direction opposite to the arbitrary direction so as to be away from the source 28. For example, the source 28 may be placed on the lower side of the sensor 24. In this case, the lens 23 and the sensor 24 are disposed such that the axis JS of the sensor 24 is shifted from the optical axis JL of the lens 23 towards the upper side so as to be away from the source 28. Further, the source 28 may be placed on the right or left side of the sensor 24. In this case, the lens 23 and the sensor 24 are disposed such that the axis JS of the sensor 24 is shifted from the optical axis JL of the lens 23 towards the left or right side so as to be away from the source 28.

Further, in this embodiment, as shown in FIG. 3B, the axes JL, JS and JM are set to be approximately perpendicular to the surface 16a of the board 16, so that the axes JL, JS and JM substantially become parallel to one another. However, the axes JL, JS and JM may be inclined with respect to the surface 16a of the board 16 on condition that the axes JL, JS and JM are substantially parallel to one another.

Moreover, marker light Lm is produced in the hologram 27 not directly attached to the board 16. However, the hologram 27 may be integrally formed with the source 28. In this case, a combination of the hologram 27 and the source 28 substantially acts as a marker light source emitting marker light, and this marker light source is directly disposed on the surface 16a of the board 16.

Furthermore, the inter-axis distance Da is set to approximately equal a half of the length of the shorter side AS. Therefore, the whole image of the two-dimensional code Q can be formed on the surface 24a of the sensor 24 at the width equal to twice the offset value F. However, the inter-axis distance Da may be set to be shorter than a half of the length of the shorter side AS. Further, when the surface 24a of the sensor 24 is wider than a product of the code area size and the magnification Di/Do, the inter-axis distance Da may be set to be longer than a half of the length of the shorter side AS.

Still further, the marker light Lm outputted from the marker light optical system 25 is used only to place the readable area Ar of the reader 10 on the object R, and information of the two-dimensional code Q is read from the illumination light emitted from the light sources 29 and reflected from the object R. However, after the marker light is used for the positioning of the reader 10, information of the two-dimensional code Q may be read from the marker light reflected from the object R. In this case, no illumination optical system is required.

Still further, the reader 10 optically reads a two-dimensional code. However, the reader 10 may optically read a one-dimensional code, a symbol, a sign, a mark or the like.

Embodiment 2

A handy gun type two-dimensional code reader having a plurality of light reading optical systems will be described according to the second embodiment. This reader represents an information reader according to the present invention.

Figure 6A:
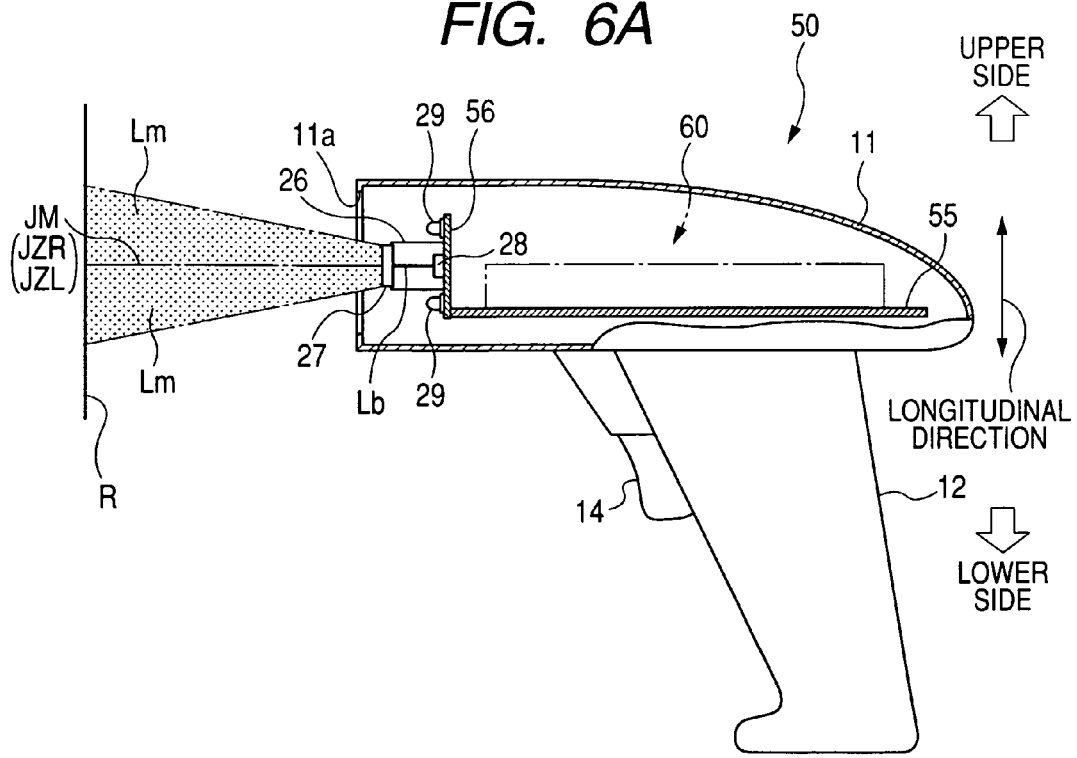
FIG. 6A is a side view, partially in cross-section, of a two-dimensional code reader according to the second embodiment of the present invention.
Figure 6B:
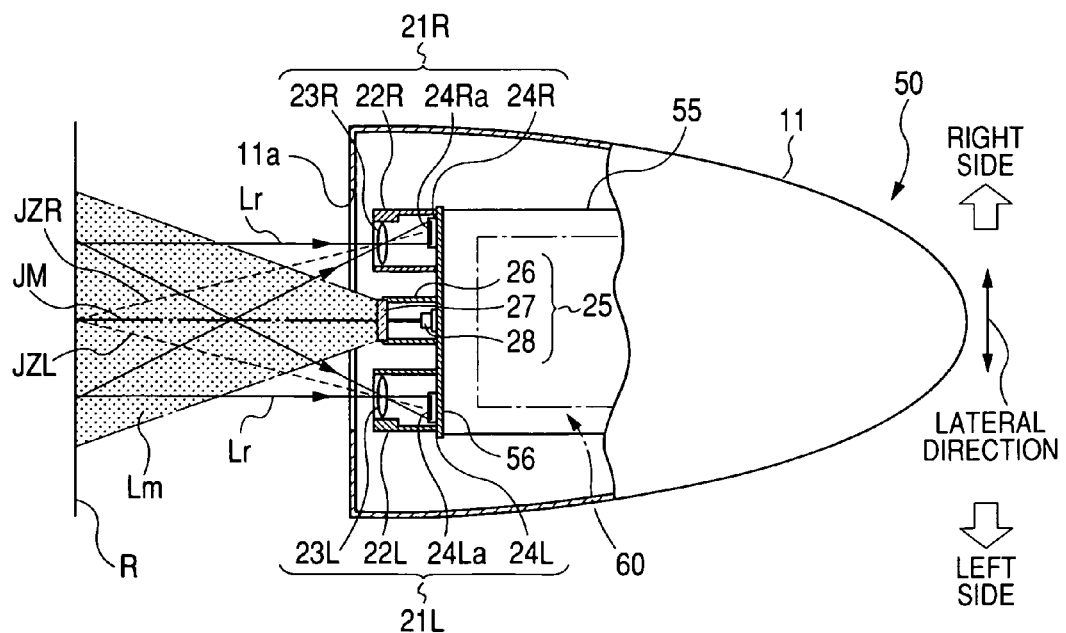
FIG. 6B is a top view, partially in cross-section, of the code reader shown in FIG. 6A.
Figure 7:
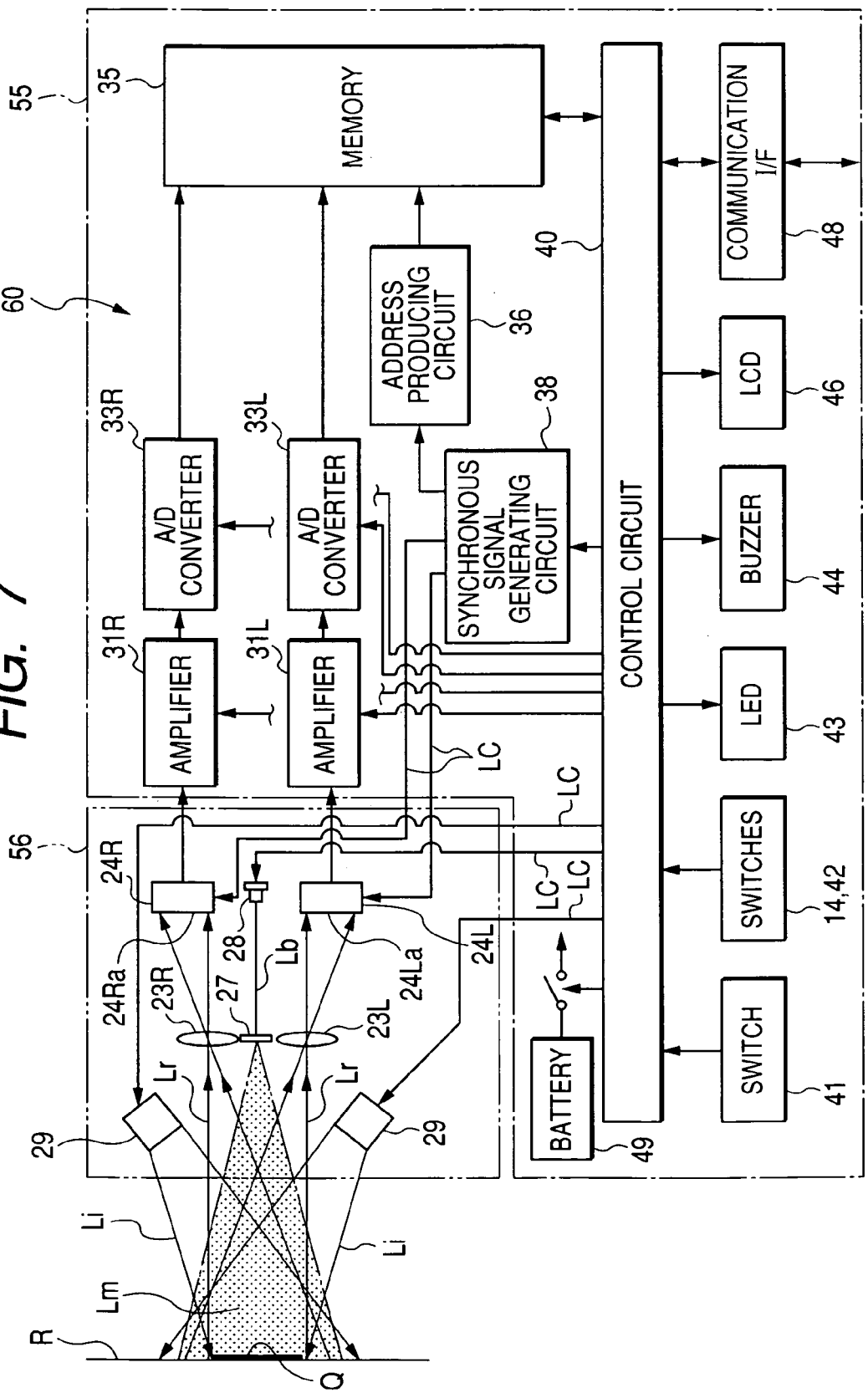
FIG. 7 is a view showing the structure of optical systems and a block diagram of a micro-computer system in the code reader shown in FIG. 6A.
Figure 8A:
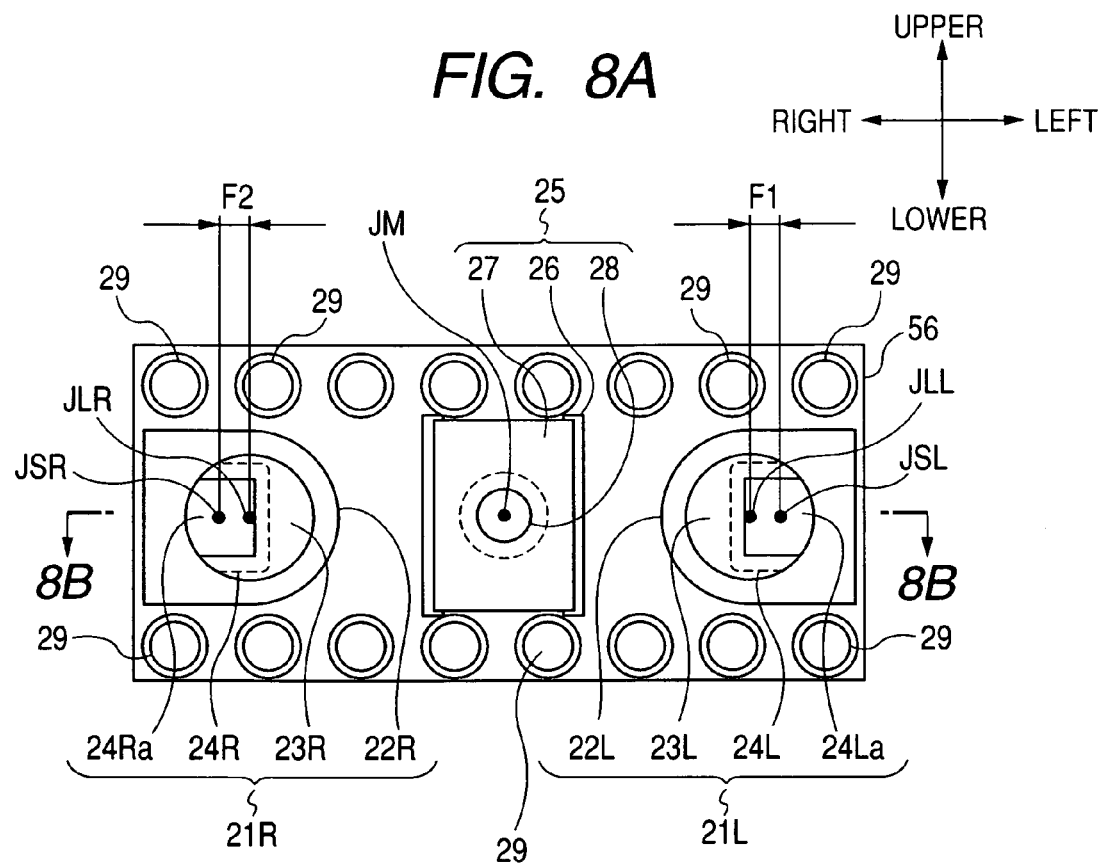
FIG. 8A is a partial front view of the code reader shown in FIG. 6A.
Figure 8B:
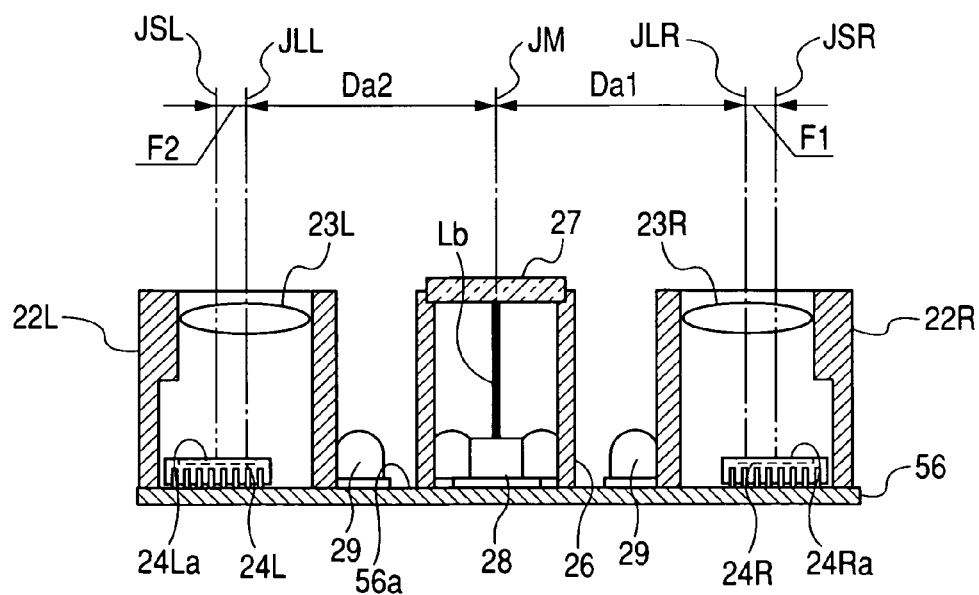
FIG. 8B is a sectional view taken substantially along line 8B-8B of FIG. 8A.
Figure 9:
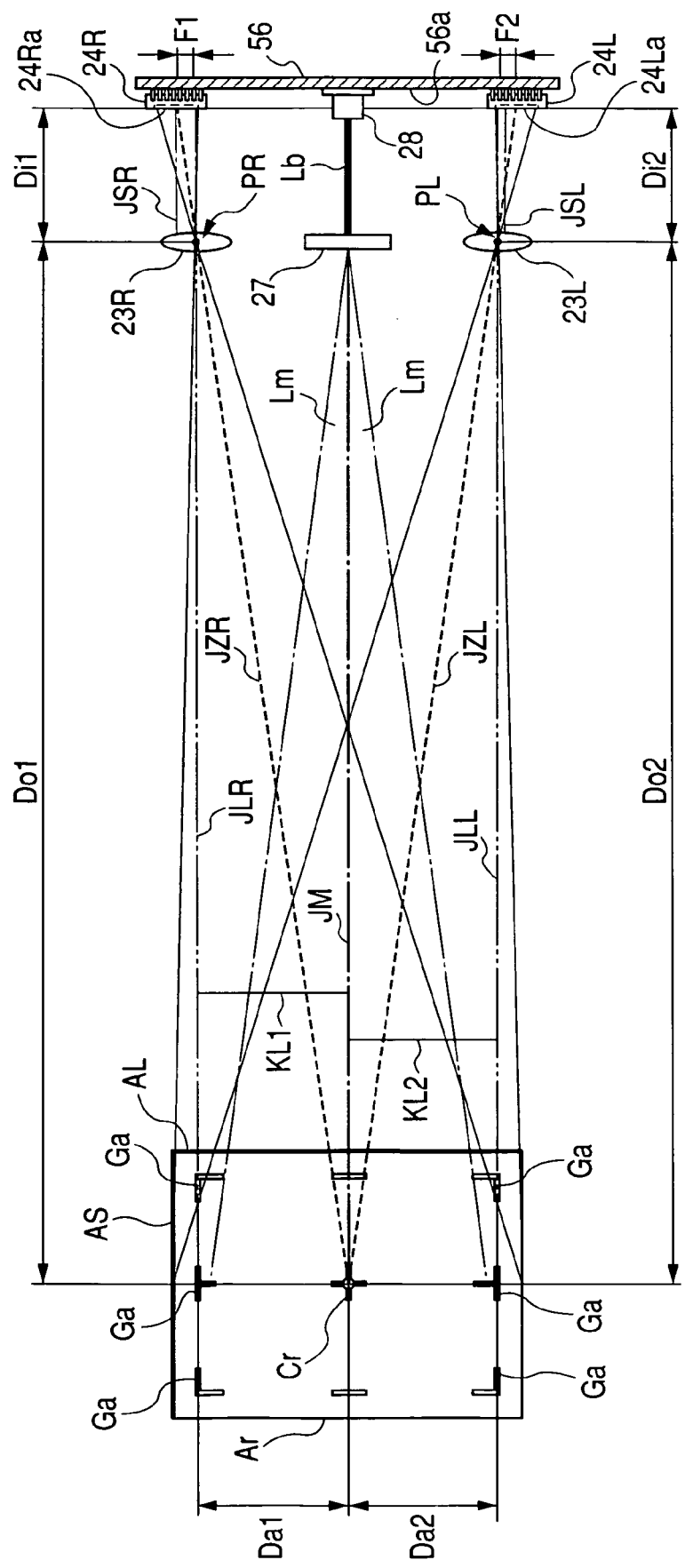
FIG. 9 is an explanatory view showing a positional relationship among light receiving optical systems and a marker light optical system in the code reader shown in FIG. 6A.

FIG. 6A is a side view, partially in cross-section, of a two-dimensional code reader according to the second embodiment, while FIG. 6B is a top view, partially in cross-section, of the code reader. FIG. 7 is a view showing the structure of optical systems and a block diagram of a micro-computer system in the code reader. FIG. 8A is a partial front view of the code reader, while FIG. 8B is a sectional view taken substantially along line 8B-8B of FIG. 8A. FIG. 9 is an explanatory view showing the positional relationship among lenses and sensors of light receiving optical systems and a light source of a marker light optical system.

As shown in FIG. 6A and FIG. 6B, a two-dimensional code reader 50 has the body 11 and the grip 12. The body 11 accommodates the marker light optical system 25, a first light receiving optical system 21R disposed on the right side of the system 25, a micro-computer system 60, a second light receiving optical system 21L disposed on the left side of the system 25 when being seen from the rear side of the reader 50, a single printed wiring board (or supporting member) 56 on which the systems 21L, 21R and 25 are disposed, and a micro-computer system unit board 55 on which the system 60 is disposed. The board 56 is formed in a rectangular shape lengthened along the lateral direction.

The light source 28 of the optical system 25 is disposed on the board 56 such that the axis JM of the light source 28 is substantially perpendicular to a surface 56a of the board 56 (see FIG. 8B). Each of the optical systems 21L and 21R is operated in the same manner as the optical system 21 shown in FIG. 1A.

As shown in FIG. 6A, FIG. 6B, FIG. 7, FIG. 8A and FIG. 8B, the optical system 21L has an image forming lens 23L set at a focal length Lf1, an image pickup sensor 24L fixedly attached to the surface 56a of the board 56, and a lens-barrel 22L standing on the surface 56a of the board 56 so as to support the lens 23L while surrounding the sensor 24L. The sensor 24L has an image forming surface 24La formed in a rectangular shape lengthened along the longitudinal direction of the reader 10 to form, on the surface 24La, an image of a two-dimensional code Q having a longer side extending along the longitudinal direction of the reader 50. The optical system 21R has an image forming lens 23R set at a focal length Lf2, an image pickup sensor 24R fixedly attached to the surface 56a of the board 56, and a lens-barrel 22R standing on the surface 56a of the board 56 so as to support the lens 23R while surrounding the sensor 24R. The sensor 24R has an image forming surface 24Ra formed in a rectangular shape lengthened along the longitudinal direction of the reader 10 to form, on the surface 24Ra, an image of a two-dimensional code Q having a longer side extending along the longitudinal direction of the reader 50.

As shown in FIG. 7, the micro-computer system 60 has amplifiers 31L and 31R, analog-to-digital converters 33L and 33R, the synchronous signal generating circuit 38, the address producing circuit 36, the memory 35, the switches 41, 41 and 42, the LED 43, the buzzer 44, the LCD 46, the communication interface 48, the battery 49 and the control circuit 40. An image signal indicating an image of the code Q formed on the surface 24Ra of the sensor 24R is amplified in the amplifier 31R at a predetermined gain, and the amplified signal is converted into first image data of a digitized image signal in the converter 33R. An image signal indicating an image of the code Q formed on the surface 24La of the sensor 24L is amplified in the amplifier 31L at a predetermined gain, and the amplified signal is converted into second image data of a digitalized image signal in the converter 33L. Then, the first image data and second image data are stored with respective addresses in the memory 35. Thereafter, the control unit 40 detects an image of the code Q from each of the first image data and second image data and finally determines the image of the code Q by comparing the detected images.

As shown in FIG. 8B, the orientation of the lens 23L is set such that an optical axis JLL of the lens 23L passing through a principal point (i.e., center) PL of the lens 23L substantially becomes perpendicular to the surface 56a of the board 56. An optical axis JZL (see FIG. 6B) of the optical system 21L passing through the principal point PL of the lens 23L intersects the surface 24La of the sensor 24L at a specific point 24Lc. The axis of the sensor 24L being perpendicular to the surface 24La and substantially passing through the point 24Lc of the surface 24La is defined as a sensor axis JSL of the sensor 24L. The orientation of the sensor 24L is set on the board 56 such that the axis JSL of the sensor 24L substantially becomes perpendicular to the surface 56a of the board 56. The sensor 24L is directly attached to the board 56 without using any spacer between the sensor and the board 56. Therefore, the axis JSL of the sensor 24L and the axis JLL of the lenses 23L are substantially parallel to the axis JM of the light source 28, and the axes JSL and JM are placed on the same plane.

In the same manner, the orientation of the lens 23R is set such that an optical axis JLR of the lens 23R passing through a principal point (i.e., center) PR of the lens 23R is substantially perpendicular to the surface 56a of the board 56. An optical axis JZR (see FIG. 6B) of the optical system 21R passing through the principal point PR of the lens 23R intersects the surface 24Ra of the sensor 24R at a specific point 24Rc. An axis of the sensor 24R being perpendicular to the surface 24Ra and substantially passing through the point 24Rc of the surface 24Ra is defined as a sensor axis JSR of the sensor 24R. The orientation of the sensor 24R is set on the board 56 such that the axis JSR of the sensor 24R is substantially perpendicular to the surface 56a of the board 56. The sensor 24R is directly attached to the board 56 without using any spacer between the sensor and the board 56. Therefore, the axis JSR of the sensor 24R and the axis JLR of the lens 23R are substantially parallel to the axis JM of the light source 28, and the axes JSR and JM are placed on the same plane. When the sensors 24L and 24R and source 28 are disposed such that the axes JSL, JSR and JM are placed in a line, the axes JSL, JSR and JM are placed on the same plane.

Each of the sensors 24L and 24R is disposed on the board 56 such that the sensor can be seen from the outside of the body 11 through the opening 11a. The sensor 24R is positioned such that the point 24Rc of the surface 24Ra is shifted from the optical axis JLR of the lens 23R towards the right side of the reader 10 by an offset value F1 so as to be further away from the light source 28. Therefore, the axes JM, JSR and JLR are placed on the same plane. Because the axes JM, JSR and JLR are placed on the same plane, an optical axis JZR of the optical system 21R passing through both the principal point PR of the lens 23R and the point 24Rc of the sensor 24R crosses the axis JM (see FIG. 9).

In the same manner, the sensor 24L is positioned such that the point 24Lc of the surface 24La is shifted from the optical axis JLL of the lens 23L towards the left side of the reader 10 by an offset value F2 so as to be further away from the light source 28. Therefore, the axes JM, JSL and JLL are placed on the same plane. Because the axes JM, JSL and JLL are placed on the same plane, an optical axis JZL of the optical system 21L passing through both the principal point PL of the lens 23L and the point 24Lc of the sensor 24L crosses the axis JM (see FIG. 9).

The positional relationship among the source 28, the lenses 23L and 23R and the sensors 24L and 24R is described below with reference to FIG. 9.

As shown in FIG. 9, the optical systems 21L and 21R are, for example, set such that a readable area of the optical system 21R is almost the same as a readable area of the optical system 21L. Each of the optical axes JZL and JZR of the optical systems 21L and 21R passes through the center Cr of the readable area Ar. The reader 50 is configured so as to have an inter-axis distance Da1 between the axis JM of the light source 28 and the axis JLR of the lens 23R, an object point distance Do1 between a readable area Ar and the principal point PR of the lens 23R, an image point distance Di1 between the principal point PR of the lens 23R and the surface 24aR of the sensor 24R, and the offset value F1 between the axis JLR and the point 24Rc of the sensor 24R. The distance Do1 satisfies an in-focus relationship of $1/Di1+1/Do1=1/Lf1$. The offset value F1 is set at the value of $Da1 \times Di1/Do1$. The value $Di1/Do1$ denotes the magnification of the lens 23R. The offset value F1 is set such that the axis JM of the marker light source 28 meets the axis JSR of the sensor 24R at the center Cr of the readable area Ar.

In the same manner, the reader 50 is configured so as to have an inter-axis distance Da2 between the axis JM of the light source 28 and the axis JLL of the lens 23L, an object point distance Do2 between the readable area Ar and the principal point PL of the lens 23L, an image point distance Di2 between the principal point PL of the lens 23L and the surface 24aL of the sensor 24L, and the offset value F2 between the axis JLL and the point 24Lc of the sensor 24L. The distance Do2 satisfies an in-focus relationship of $1/Di2+1/Do2=1/Lf2$. The offset value F2 is set at the value of $Da2 \times Di2/Do2$. The value $Di2/Do2$ denotes the magnification of the lens 23L. The offset value F2 is set such that the axis JM of the marker light source 28 meets the axis JSL of the sensor 24L at the center Cr of the readable area Ar.

Therefore, the optical axis JZR of the optical system 21R crosses the surface 24aR of the sensor 24R at a position which is shifted from the optical axis JLR of the lens 23R by the offset F1 to the right so as to be away from the marker light source 28. The position of the surface 24aR meeting the optical axis JZR may be placed at the center of the surface 24aR or may be near the center of the surface 24aR. In the same manner, the optical axis JZL of the optical system 21L crosses the surface 24aL of the sensor surface 24L at a position which is shifted from the optical axis JLL of the lens 23L by the offset F2 in the right direction so as to be away from the marker light source 28. The position of the surface 24aL meeting the optical axis JZL may be placed at the center of the surface 24aL or may be near the center of the surface 24aL. Further, the axis JM of the light source 28 crosses the center Cr of the readable area Ar at which the optical axes JZL and JZR of the optical systems 21L and 21R cross each other.

When the object R is placed in the readable area Ar so as to hold the optical conjugate relation in the optical system 21R, a first object-image distance between the two-dimensional code Q of the object R and an image formed on the surface 24aR of the sensor 24R becomes equal to a sum Do1+Di1 of the distance Do1 and the distance Di1. In the same manner, when the object R is placed in the readable area Rr so as to hold the optical conjugate relation in the optical system 21L, a second object-image distance between the two-dimensional code Q of the object R and an image formed on the surface 24aL of the sensor 24L becomes equal to a sum Do2+Di2 of the distance Do1 and the distance Di1. Because the readable area for the optical system 21L is set to be the same as that for the optical system 21R, the first object-image distance equals the second object-image distance (Do1+Di1=Do2+Di2).

Therefore, because of the axis JSR of the sensor 24R being differentiated or offset from the optical axis JLR of the lens 23R by the offset value F1, even when the source 28 and the sensor 24R are attached to the board 56 in a positional relationship that the axis JM of the source 28 becomes parallel to the axis JSR of the sensor 24R (see FIG. 8B), the axis JM of the source 28 can be set to pass through the center of the reading area Ar through which the optical axis JZR of the optical system 21R passes. That is, with the structure of the reader 50 that the source 28, the lens 23R and the sensor 24R are disposed on the board 56 such that the axis JM of the source 28 does not cross the axis JSR of the sensor 24R at a certain angle, when the object R is placed in the reading area Ar so as to place the center Cr of the area Ar at the center of the two-dimensional code Q of the object R, the optical axis JZR of the optical system 21R can be placed on the center of the code Q at the object-image distance D01+Di1.

In the same manner, because of the axis JSL of the sensor 24L being differentiated or offset from the optical axis JLL of the lens 23L by the offset value F2, even when the source 28 and the sensor 24L are attached to the board 56 in a positional relationship that the axis JM of the source 28 becomes parallel to the axis JSL of the sensor 24L (see FIG. 8B), the axis JM of the source 28 can be set to pass through the center of the reading area Ar through which the optical axis JZL of the optical system 21L passes. That is, with the structure of the reader 50 that the source 28, the lens 23L and the sensor 24L are disposed on the board 56 such that the axis JM of the source 28 does not cross the axis JSL of the sensor 24L at a certain angle, when the object R is placed in the reading area Ar so as to place the center Cr of the area Ar at the center of the two-dimensional code Q of the object R, the optical axis JZL of the optical system 21L can be placed on the center of the code Q at the object-image distance D02+Di2.

In the manufacture of the reader 50, to directly attach the source 28 and the sensors 24L and 24R to the board 56, a mounting apparatus for automatically mounting electric parts into an electric apparatus is used. Therefore, the source 28 and the sensors 24L and 24R can be independently positioned by the mounting apparatus with high precision. Further, because the lenses 23L and 23R are fixed to the respective lens-barrels 22L and 22R directly attached to the board 56, the lenses 23L and 23R, the sensors 24L and 24R and the source 28 can be independently positioned with high precision. Accordingly, it is not required to minutely adjust the positional relationship among the lenses 23L and 23R, the sensors 24L and 24R and the source 28.

Therefore, it is not required that the sensors 24L and 24R of the optical systems 21L and 21R and the source 28 of the marker optical system 25 are attached to respective supporting members (e.g., sub-substrates, or supporting posts or convex portions extending from the inner wall of the body 11). Further, it is not required that at least two of the sensors 24L and 24R and the source 28 are indirectly attached to the board 56 through respective spacer or the like to dispose the two of the sensors 24L and 24R and the source 28 at a small angle with respect to the surface 56a of the board 56. In this case, the number of assembling processes and the number of adjusting processes required for the manufacturing of the reader 50 can be reduced as well as reducing the number of parts required for the reader 50. That is, the marker optical system 25 and the light receiving optical systems 21L and 21R can be easily disposed in a simplified structure.

With this structure of the reader 50, a first image of the two-dimensional code Q seen from the right side of the reader 50 is formed on the surface 24Ra of the sensor 24R, and a second image of the two-dimensional code Q seen from the left side of the reader 50 is formed on the surface 24La of the sensor 24. The system 60 reads a first information code and a second information code from the first and second images, respectively. Then, the system 60 selects one of the information codes and outputs the selected information code. Alternatively, the system 60 combines the information codes to obtain a combined information code, and the system 60 outputs the combined information code. Therefore, the reader can optically read the two-dimensional code Q from the object R.

As described above, in the reader 50, the board 56 supports the marker light source 28 and the sensor 24L disposed on the left side of the source 28 and the sensor 24R disposed on the right side of the source 28 such that the axis JM of the source 28 and the axes JSL and JSR of the sensors 24L and 24R are parallel to one another, the axis JSR of the sensor 24R is differentiated from the optical axis JLR of the lens 23R by the offset value F1 (=Da1×Di1/Do1) such that the axis JSR is shifted from the optical axis JLR in the right direction away from the source 28, and the axis JSL of the sensor 24L is differentiated from the optical axis JLL of the lens 23L by the offset value F2 (=Da2×Di2/Do2) such that the axis JSL is shifted from the optical axis JLL in the left direction away from the source 28.

The offset value F1 is equal to a product of the inter-axis distance Da1 between the axis JM and the axis JLR and the magnification Di1/Do1 of the lens 23R. That is, the axis JSR of the sensor 24R is differentiated from the axis JM of the source 28 by a sum Da1+F1 of the distance Da1 and the offset value F1. The magnification Di1/Do1 is expressed as the ratio of the image point distance Di1 between the principal point PR of the lens 23R and the surface 24Ra of the sensor 24R to the object point distance Do1 between the readable area Ar and the principal point PR of the lens 23R. The distance Do1 satisfies an in-focus relationship of 1/DO1+1/Di1=1/Lf1. The value Lf1 denotes a focal length of the lens 23R.

The offset value F2 is equal to a product of the inter-axis distance Da2 between the axis JM and the axis JLL and the magnification Di2/Do2 of the lens 23L. That is, the axis JSL of the sensor 24L is differentiated from the axis JM of the source 28 by a sum Da2+F2 of the distance Da2 and the offset value F2. The magnification Di2/Do2 is expressed as the ratio of the image point distance Di2 between the principal point PL of the lens 23L and the surface 24La of the sensor 24L to the object point distance Do2 between the readable area Ar and the principal point PL of the lens 23L. The distance Do2 satisfies an in-focus relationship of $1/Do2+1/Di2=1/Lf2$. The value Lf2 denotes the focal length of the lens 23L.

Therefore, even when the axis JM of the source 28 and the axes JSL and JSR of the sensors 24L and 24R are set to be parallel to one another, the positional relationship between the axis JM of the source 28 and the optical axis JZR of the optical system 21R can be set such that the axis JM passes through the center Cr of the readable area Ar on which the optical axis JZR is placed, and the positional relationship between the axis JM of the source 28 and the optical axis JZL of the optical system 21L can be set such that the axis JM passes through the center Cr of the readable area Ar on which the optical axis JZL is placed. With these positional relationships, when a user adjusts the position of the reader 50 to place the center of the marker light Lm approximately at the center of the code area of the object R and to appropriately set the distance between the reader 50 and the object R, the center of the two-dimensional code Q can be placed approximately at the center Cr of the readable area Ar on which the optical axes JZL and JZR of the optical systems 21L and 21R are placed. This means that it is not required to cross the axis JM and the axis JSL of the sensor 24L or to cross the axis JM and the axis JSR of the sensor 24R. That is, it is not required that the source 28 and the sensors 24L and 24R are attached to respective supporting members, nor is it required that at least two of the source 28 and the sensors 24L and 24R are attached to the board 56 through respective spacers.

Accordingly, the marker optical system 25 and the light receiving optical systems 21L and 21R can be easily disposed in the reader 50 in a simplified structure, and the number of assembling processes and the number of adjusting processes required for the manufacturing of the reader 50 can be reduced as well as reducing the number of parts required for the reader 50.

Further, because the sensors 24L and 24R are disposed on the left and right sides of the reader 50, the reader 50 can read the code Q at different angles to the object R. Therefore, even when an image of the code Q is not clearly formed in one of the sensors 24L or 24R because light directly reflected from the code Q in a mirror reflection is converged on the sensor, an image of the code Q can be clearly formed in the other sensor because light converged on the other sensor does not cause the mirror reflection.

Moreover, circuit leads Lc (see FIG. 7) extending from the control unit 40 and the circuit 38 are disposed on the substrate 56, and the circuit leads Lc are electrically connected with the source 28 and the sensors 24L or 24R attached to the substrate 56. Accordingly, as compared with a case where the source 28 and the sensors 24L or 24R are attached to respective supporting members, the wiring of the circuit leads can be simplified. That is, the number of assembling processes and the number of adjusting processes required for the manufacturing of the reader 50 can be further reduced as well as the reduction in the number of parts required for the reader 50.

Furthermore, as shown in FIG. 9, to form the readable area Ar such that each longer side AL of the area Ar extends along the lateral direction of the reader 50, the sensor 24R is shifted by the offset value F1 from the lens 23R towards the right direction away from the source 28 so as to set an imaginary line KL1, placed at right angles to both the optical axis JLR and the axis JM, to be approximately in parallel to the longer side AL of the readable area Ar. In the same manner, the sensor 24L is shifted by the offset value F2 from the lens 23L towards the left direction away from the source 28 so as to set an imaginary line KL2, placed at right angles to both the optical axis JLL and the axis JM at right angles, to be approximately in parallel to the longer side AL of the readable area Ar. Therefore, as compared with a case where the sensors 24L and 24R are disposed such that each of the imaginary lines KL1 and KL2 is approximately parallel to the shorter side AS of the readable area Ar, the width of the board 56 in the longitudinal direction of the reader 50 can be shortened. Accordingly, the thickness of the body 11 in the longitudinal direction can be reduced.

In this embodiment, as shown in FIG. 6B and FIG. 8A, the sensor 24L of the optical system 21L is placed on the left side of the source 28 of the optical system 25, and the sensor 24R of the optical system 21R is placed on the right side of the source 28 of the optical system 25. For example, when the distances Da1 and Da2 equal each other, the sensors 24L and 24R are symmetrically disposed with respect to the source 28. However, two sensors of two light receiving optical systems may be placed to be shifted from the source 28 in a first direction between the longitudinal and lateral directions and a second direction opposite to the first direction, respectively. In this case, the sensor shifted from the source 28 in the first direction and a lens which converges light on the sensor are disposed such that the sensor axis of the sensor is shifted from the optical axis of the lens in the first direction so as to be away from the source 28, and the sensor shifted from the source 28 in the second direction and a lens which converges light on the sensor are disposed such that the sensor axis of the sensor is shifted from the optical axis of the lens in the second direction so as to be away from the source 28.

For example, two sensors of two light receiving optical systems may be placed on the upper and lower sides of the source 28.

Figure 10:
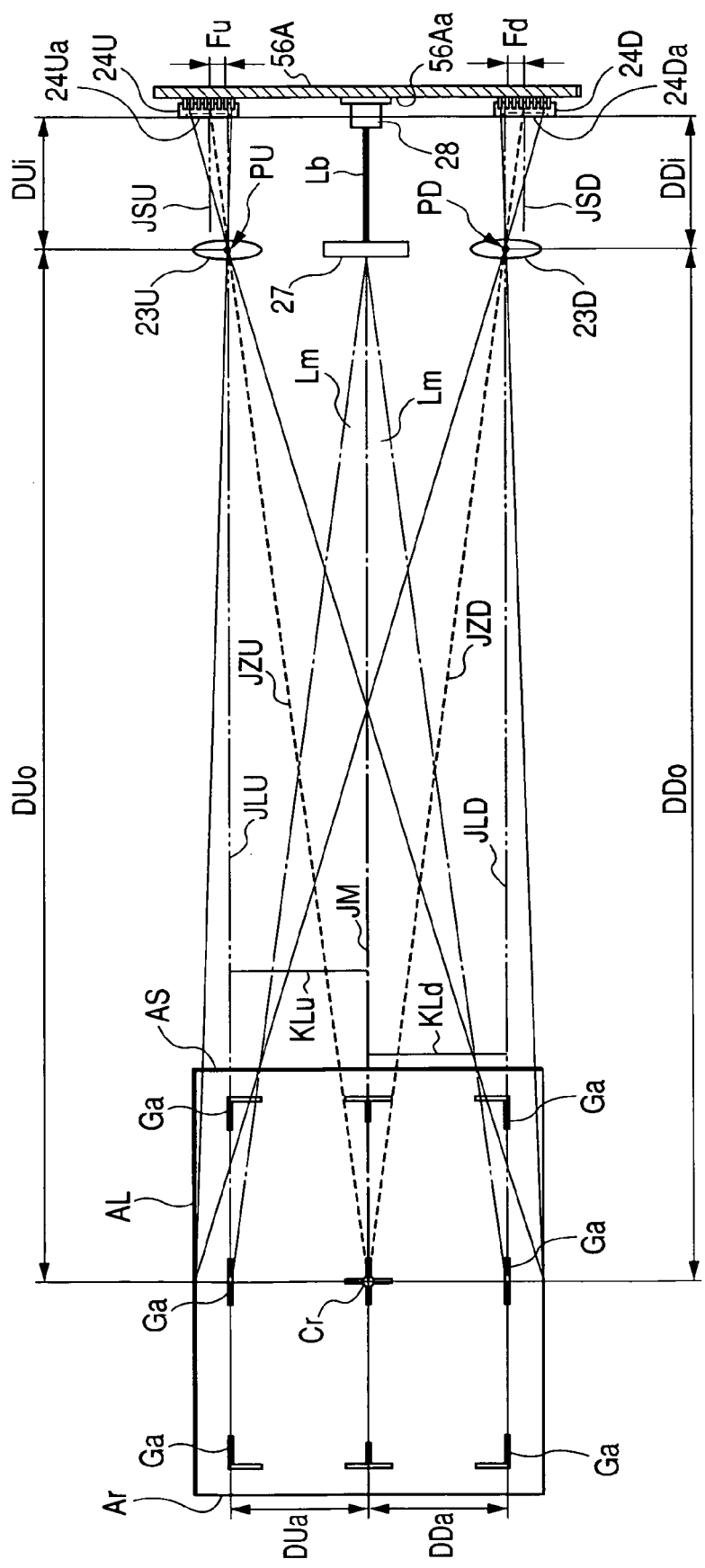
FIG. 10 is an explanatory view showing a positional relationship among light receiving optical systems and a marker light optical system in a code reader according to a modification of the second embodiment.

FIG. 10 is an explanatory view showing two sensors of two light receiving optical systems placed on the upper and lower sides of the source 28 in a code reader according to a modification of the second embodiment.

As shown in FIG. 10, an information reader 50A has a single printed wiring board (or supporting member) 56A formed in a rectangular shape to be lengthened along the longitudinal direction of the reader. An upper light receiving optical system having a light receiving sensor 24U and an image forming lens 23U set at a focal length LUf is disposed on the upper side of the source 28. The lens 23U converges light reflected from a readable area Ar on a surface 24Ua of the sensor 24U. A lower light receiving optical system having a light receiving sensor 24D and an image forming lens 23D set at a focal length LDf is disposed on the lower side of the source 28. The lens 23D converges light reflected from the readable area Ar on a surface 24Da of the sensor 24D. The sensors 24U and 24D and the light source 28 are directly attached to a surface 56Aa of the board 56A such that the axis JM, a sensor axis JSU of the sensor 24U and a sensor axis JSD of the sensor 24D are substantially parallel to one another. The lens 23U is disposed such that an optical axis JLU of the lens 23U is substantially perpendicular to the surface 24Ua of the sensor 24U. The lens 23D is disposed such that an optical axis JLD of the lens 23D is substantially perpendicular to the surface 24Da of the sensor 24D.

The reader 50A is configured so as to have an inter-axis distance DUa between the axis JM of the light source 28 and the optical axis JLU of the lens 23U, an object point distance DUo between the readable area Ar and the principal point PU of the lens 23U, an image point distance DUi between the principal point PU of the lens 23U and the surface 24Ua of the sensor 24U, an inter-axis distance DDa between the axis JM of the light source 28 and the optical axis JLD of the lens 23D, an object point distance DDo between the readable area Ar and the principal point PD of the lens 23D, and an image point distance DDi between the principal point PD of the lens 23D and the surface 24Da of the sensor 24D. The distance DUo satisfies an in-focus relationship of 1/DUi+1/DUo=1/LUf. The distance DDo satisfies an in-focus relationship of 1/DDi+1/DDo=1/LDf. Each of the distances DUa and DDa is, for example, set at a half of the length of the shorter side AS of the area Ar.

The sensor 24U is disposed such that the axis JSU of the sensor 24U is shifted towards the upper side by an upper offset value Fu (=DUa×DUi/DUo) from the optical axis JLU of the lens 23U so as to be away from the source 28. The sensor 24D is disposed such that the axis JSD of the sensor 24D is shifted towards the lower side by a lower offset value Fd (=DDa×DDi/DDo) from the optical axis JLD of the lens 23D so as to be away from the source 28.

With this structure of the reader 50A, an imaginary line KLu connected with each of the optical axis JLU and the axis JM at right angles is approximately parallel to the extending direction of the shorter side AS, and an imaginary line KLd connected with each of the optical axis JLD and the axis JM at right angles is approximately parallel to the extending direction of the shorter side AS. As compared with the reader 50 wherein each of the imaginary line KLu and KLd is approximately parallel to the extending direction of the longer side AL, the distances DUa and DDa in the reader 50A become shorter than the distances Da1 and Da2 in the reader 50. Therefore, the offset values Fu and Fd become lower than the offset values F1 and F2.

Accordingly, a small-sized information reader can be manufactured as compared with the reader 50 shown in FIG. 6A. Further, although the thickness of the reader 50A along the longitudinal direction is increased by shifting the sensors 24U and 24D in the longitudinal direction, the increase of the thickness in the reader 50A can be set at a small value.

Further, in this embodiment, two sensors of two light receiving optical systems may be placed to be shifted from the source 28 in an arbitrary direction between the longitudinal and lateral directions together at different distances from the source 28. In this case, each of the sensors and a lens converging light on the sensor are disposed such that a sensor axis of the sensor is shifted from an optical axis of the lens in the arbitrary direction so as to be away from the source 28.

Moreover, each of the inter-axis distances Da1 and Da2 is set to approximately equal a half of the length of the longer side AL. However, each inter-axis distance may be set to be shorter than a half of the length of the longer side AL or to be longer than a half of the length of the longer side AL.

Furthermore, in this embodiment, two light receiving optical systems are disposed around the marker optical system 25. However, three light receiving optical systems or more may be disposed around the marker optical system 25.

Still further, in this embodiment, the readable area set by the optical system 21L is approximately the same as that set by the optical system 21R. However, the readable areas may have different sizes on condition that the first object-image distance equals the second object-image distance (Do1+Di1=Do2+Di2).

What is claimed is:

1. An information reader, comprising:
   a light receiving optical system that sets a readable area, receives image forming light from a display medium placed in the readable area, and forms a code image from the image forming light to optically read, from the code image, an information code marked on the display medium;
   a marker light source that emits marker light to the display medium along a light emission axis of the marker light source to place the display medium in the readable area; and
   a supporting member that supports the marker light source and the light receiving optical system,
   wherein the light receiving optical system comprises:
      a light receiving sensor that receives the image forming light and forms the code image on an image forming surface of the sensor, a sensor axis being perpendicular to the image forming surface and substantially passing through an intersection of an optical axis of the light receiving optical system and the image forming surface; and
      a lens that converges the image forming light onto the image forming surface of the light receiving sensor, a principal point of the lens being away from the readable area by an object point distance Do, the principal point of the lens being away from the image forming surface of the light receiving sensor by an image point distance Di,
   wherein the supporting member supports the marker light source and the light receiving sensor such that the sensor axis of the light receiving sensor and the light emission axis of the marker light source are substantially parallel to each other,
   wherein an optical axis of the lens and the light emission axis of the marker light source are separated by an inter-axis distance Da,
   and wherein the sensor axis of the light receiving sensor is differentiated from the optical axis of the lens by an offset value F satisfying a relationship of F=Da×Di/Do such that the sensor axis of the light receiving sensor is shifted from the optical axis of the lens in a direction away from the marker light source.

2. The information reader according to claim 1, wherein the light receiving optical system is adapted to form the readable area in a rectangular shape having a longer side and a shorter side, and
   a positional relationship between the light emission axis of the marker light source and the optical axis of the lens is set such that an imaginary line placed at right angles to the light emission axis and the optical axis is substantially parallel to the shorter side of the readable area.

3. The information reader according to claim 1, further comprising:
   a control system that detects the information code from the code image formed in the light receiving sensor,
   wherein the supporting member is configured to be a printed wiring board having a substrate surface on which circuit leads extending from the control system are disposed and are electrically connected with the marker light source and the light receiving sensor to operate the marker light source and the light receiving sensor under control of the control system, and
   the marker light source and the light receiving sensor are disposed on the substrate surface of the printed wiring board such that the light emission axis of the marker light source and the sensor axis of the light receiving sensor are substantially perpendicular to the substrate surface of the printed wiring board.

4. The information reader according to claim 1, wherein a distance between the light emission axis of the marker light source and the sensor axis of the light receiving sensor equals a sum of the inter-axis distance and the offset value.

5. The information reader according to claim 1, wherein
a center of the reading area is placed on the optical axis of the light receiving optical system, and the light emission axis of the marker light source passes through the center of the reading area.

6. The information reader according to claim 1, wherein the supporting member has a single board on which the marker light source and the light receiving sensor are directly disposed together.

7. The information reader according to claim 1, wherein the lens is disposed such that the optical axis of the lens and the sensor axis of the light receiving sensor are substantially parallel to each other.

8. The information reader according to claim 1, wherein
the information code is formed in a rectangular shape having a longer side and a shorter side, and
the inter-axis distance Da is set to substantially equal a half of a length of the shorter side.

9. An information reader, comprising:
a first light receiving optical system that sets a readable area, receives first image forming light from a display medium placed in the readable area, and forms a first code image from the first image forming light to optically read, from the first code image, an information code marked on the display medium;
a second light receiving optical system that receives second image forming light from the display medium placed in the readable area, and forms a second code image from the second image forming light to optically read, from the second code image, the information code;
a marker light source that emits marker light to the display medium along a light emission axis of the marker light source to place the display medium in the readable area; and
a supporting member that supports the marker light source and the first and second light receiving optical systems,
wherein the first light receiving optical system comprises:
a first light receiving sensor that receives the first image forming light to form the first code image on an image forming surface of the first light receiving sensor, a sensor axis of the first light receiving sensor substantially passing through an intersection of an optical axis of the first light receiving optical system and the image forming surface and being perpendicular to the image forming surface; and
a first lens that converges the first image forming light onto the image forming surface of the first light receiving sensor, a principal point of the first lens being away from the readable area by a first object point distance Do1, the principal point of the first lens being away from the image forming surface of the first light receiving sensor by a first image point distance Di1, and
the second light receiving optical system comprises:
a second light receiving sensor that receives the second image forming light to form the second code image on an image forming surface of the second light receiving sensor, a sensor axis of the second light receiving sensor substantially passing through an intersection of an optical axis of the second light receiving optical system and the image forming surface of the second light receiving sensor and being perpendicular to the image forming surface of the second light receiving sensor; and
a second lens that converges the second image forming light onto the image forming surface of the second light receiving sensor, a principal point of the second lens being away from the readable area by a second object point distance Do2, the principal point of the second lens being away from the image forming surface of the second light receiving sensor by a second image point distance Di2;
wherein the supporting member supports the marker light source, the first light receiving sensor and the second light receiving sensor such that the sensor axes of the first and second light receiving sensors and the light emission axis of the marker light source are substantially parallel to one another,
wherein an optical axis of the first lens and the light emission axis of the marker light source are separated by a first inter-axis distance Da1, and an optical axis of the second lens and the light emission axis of the marker light source are separated by a second inter-axis distance Da2,
wherein the sensor axis of the first light receiving sensor is differentiated from the optical axis of the first lens by a first offset value F1 satisfying a relationship of $F1=Da1 \times Di1/Do1$ such that the sensor axis of the first light receiving sensor is shifted from the optical axis of the first lens in a direction away from the marker light source,
and wherein the sensor axis of the second light receiving sensor is differentiated from the optical axis of the second lens by a second offset value F2 satisfying a relationship of $F2=Da2 \times Di2/Do2$ such that the sensor axis of the second light receiving sensor is shifted from the optical axis of the second lens in a direction away from the marker light source.

10. The information reader according to claim 9, wherein
the first light receiving optical system is adapted to form the readable area in a rectangular shape having a longer side and a shorter side,
a positional relationship between the light emission axis of the marker light source and the optical axis of the first lens is set such that an imaginary line, placed at right angles to the light emission axis and the optical axis, is substantially parallel to the shorter side of the readable area, and
a positional relationship between the light emission axis of the marker light source and the optical axis of the second lens is set such that an imaginary line connected with each of the light emission axis and the optical axis at right angles is substantially parallel to the shorter side of the readable area.

11. The information reader according to claim 9, wherein
the first light receiving optical system is adapted to form the readable area in a rectangular shape having a longer side and a shorter side,
a positional relationship between the light emission axis of the marker light source and the optical axis of the first lens is set such that an imaginary line, placed at right angles to the light emission axis and the optical axis, is substantially parallel to the longer side of the readable area, and
a positional relationship between the light emission axis of the marker light source and the optical axis of the second lens is set such that an imaginary line connected with each of the light emission axis and the optical axis at right angles is substantially parallel to the longer side of the readable area.

12. The information reader according to claim 9, further comprising:
- a control system that detects the information code from the first and second code images formed in the first and second light receiving sensors,
- wherein the supporting member is configured to be a printed wiring board having a substrate surface on which circuit leads extending from the control system are disposed and are electrically connected with the marker light source and the first and second light receiving sensors to operate the marker light source and the first and second light receiving sensors under control of the control system, and
- the marker light source and the first and second light receiving sensors are disposed on the substrate surface of the printed wiring board such that the light emission axis of the marker light source and the sensor axes of the first and second light receiving sensors are substantially perpendicular to the substrate surface of the printed wiring board.

13. The information reader according to claim 9, wherein
- a distance between the light emission axis of the marker light source and the sensor axis of the first light receiving sensor equals a sum of the first inter-axis distance and the first offset value, and a distance between the light emission axis of the marker light source and the sensor axis of the second light receiving sensor equals a sum of the second inter-axis distance and the second offset value.

14. The information reader according to claim 9, wherein the first lens is disposed such that the optical axis of the first lens and the sensor axis of the first light receiving sensor are substantially parallel to each other, and the second lens is disposed such that the optical axis of the second lens and the sensor axis of the second light receiving sensor are substantially parallel to each other.

* * * * *